US008693863B2

(12) United States Patent
Oikawa et al.

(10) Patent No.: US 8,693,863 B2
(45) Date of Patent: *Apr. 8, 2014

(54) EXCHANGEABLE LENS

(71) Applicant: Nikon Corporation, Tokyo (JP)

(72) Inventors: Masafumi Oikawa, Mitaka (JP); Kazuharu Imafuji, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,828

(22) Filed: Sep. 19, 2012

(65) Prior Publication Data

US 2013/0077957 A1   Mar. 28, 2013

Related U.S. Application Data

(60) Provisional application No. 61/564,576, filed on Nov. 29, 2011.

(30) Foreign Application Priority Data

| Sep. 20, 2011 | (JP) | 2011-205067 |
| Sep. 20, 2011 | (JP) | 2011-205068 |
| Aug. 31, 2012 | (JP) | 2012-191006 |
| Aug. 31, 2012 | (JP) | 2012-191007 |

(51) Int. Cl.
 *G03B 17/00* (2006.01)
(52) U.S. Cl.
 USPC .......................................................... 396/532
(58) Field of Classification Search
 USPC .......................................................... 396/532
 See application file for complete search history.

(56) References Cited

U.S. PATENT DOCUMENTS

| 5,065,175 | A | 11/1991 | Suzuki et al. |
| 5,089,834 | A | 2/1992 | Nakasa et al. |
| 6,336,754 | B1 | 1/2002 | Sato et al. |
| 6,341,902 | B1 * | 1/2002 | Sato et al. ..................... 396/529 |
| 8,400,722 | B2 * | 3/2013 | Imafuji et al. ................ 359/822 |

(Continued)

FOREIGN PATENT DOCUMENTS

| JP | A-7-234432 | 9/1995 |
| JP | A-9-211656 | 8/1997 |

(Continued)

OTHER PUBLICATIONS

Office Action issued in Japanese Patent Application No. 2012-191002 mailed Dec. 4, 2012 (with translation).

(Continued)

*Primary Examiner* — Clayton E Laballe
*Assistant Examiner* — Dennis Hancock
(74) *Attorney, Agent, or Firm* — Oliff PLC

(57) ABSTRACT

An exchangeable lens includes a camera lens mount unit having a mount center point, to which a camera body, with twelve body connector terminals disposed near a camera body mount unit at the camera body, is attached; a holding portion where a plurality of lens connector terminals, each including a contact area to come into contact with a body connector terminal, are disposed; an optical system that includes a drive target member which can be driven; a drive unit that drives the drive target member; and a control unit to be engaged in data communication with the camera body. The drive unit and the control unit include a common ground portion.

11 Claims, 16 Drawing Sheets

(56) References Cited

U.S. PATENT DOCUMENTS

| | | | |
|---|---|---|---|
| 2009/0269049 A1* | 10/2009 | Ueda et al. | 396/529 |
| 2010/0091175 A1 | 4/2010 | Shintani et al. | |
| 2011/0317062 A1* | 12/2011 | Fujino et al. | 348/360 |
| 2012/0063020 A1* | 3/2012 | Imafuji et al. | 359/827 |
| 2012/0195587 A1 | 8/2012 | Hasuda et al. | |
| 2013/0071102 A1* | 3/2013 | Imafuji et al. | 396/532 |
| 2013/0077954 A1* | 3/2013 | Oikawa et al. | 396/530 |
| 2013/0077955 A1* | 3/2013 | Imafuji et al. | 396/532 |
| 2013/0077956 A1* | 3/2013 | Imafuji et al. | 396/532 |

FOREIGN PATENT DOCUMENTS

| | | |
|---|---|---|
| JP | A-2008-233773 | 10/2008 |
| JP | A-2010-288307 | 12/2010 |
| JP | A-2012-155290 | 8/2012 |

OTHER PUBLICATIONS

Office Action issued in Japanese Patent Application No. 2012-191003 mailed Dec. 4, 2012 (with translation).

Office Action issued in Japanese Patent Application No. 2012-191004 mailed Dec. 4, 2012 (with translation).

Office Action issued in Japanese Patent Application No. 2012-191005 mailed Dec. 4, 2012 (with translation).

Office Action issued in Japanese Patent Application No. 2012-191006 mailed Dec. 4, 2012 (with translation).

Office Action issued in Japanese Patent Application No. 2012-191007 mailed Dec. 4, 2012 (with translation).

U.S. Appl. No. 13/622,699 in the name of Imafuji et al. filed Sep. 19, 2012.

U.S. Appl. No. 13/622,787 in the name of Imafuji et al. filed Sep. 19, 2012.

U.S. Appl. No. 13/622,784 in the name of Oikawa et al. filed Sep. 19, 2012.

U.S. Appl. No. 13/622,711 in the name of Imafuji et al. filed Sep. 19, 2012.

May 3, 2013 Notice of Allowance issued in U.S. Appl. No. 13/622,787.

May 31, 2013 Supplemental Notice of Allowance issued in U.S. Appl. No. 13/622,787.

Jun. 7, 2013 Office Action issued in U.S. Appl. No. 13/622,784.

Apr. 30, 2013 Notice of Allowance issued in U.S. Appl. No. 13/622,711.

May 23, 2013 Corrected Notice of Allowability issued in U.S. Appl. No. 13/622,711.

Oct. 22, 2013 Office Action issued in U.S. Appl. No. 13/622,699.

* cited by examiner

EXCHANGEABLE LENS

This non-provisional application claims the benefit of U.S. Provisional Application No. 61/564,576 filed Nov. 29, 2011. This application also claims priority from Japanese Application No. 2011-205067 filed Sep. 20, 2011, Japanese Application No. 2011-205068 filed Sep. 20, 2011, Japanese Application No. 2012-191006 filed Aug. 31, 2012 and Japanese Application No. 2012-191007 filed Aug. 31, 2012. The disclosure of each of the earlier applications is incorporated herein by reference in its entirety.

BACKGROUND OF THE INVENTION

1. Field of the Invention

The present invention relates to an exchangeable lens.

2. Description of Related Art

The camera body in a camera system known in the related art may engage in electrical communication with an exchangeable lens. Japanese Laid Open Patent Publication No. H7-234432 discloses an exchangeable lens that includes a group of terminals enabling the exchangeable lens to communicate with the camera body and an adapter (e.g., an intermediate ring or a rear focus converter). The terminals in this terminal group, disposed next to one another so as to form a circular arc pattern, include two sets of terminals, each made up with a power supply terminal and a ground terminal.

SUMMARY OF THE INVENTION

There is an issue to be addressed with regard to the exchangeable lens disclosed in the publication cited above in that since it includes two separate systems each equipped with a ground terminal, the number of its components is bound to be large.

An exchangeable lens according to a 1st aspect of the present invention comprises: a camera lens mount unit having a mount center point, to which a camera body, with twelve body connector terminals disposed near a camera body mount unit at the camera body, is attached; a holding portion where a plurality of lens connector terminals, each including a contact area to come into contact with a body connector terminal, are disposed; an optical system that includes a drive target member which can be driven; a drive unit that drives the drive target member; and a control unit to be engaged in data communication with the camera body, wherein: the plurality of lens connector terminals comprises: a first lens connector terminal through which a drive voltage to be used to engage the drive unit in operation is provided from the camera body; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; and an eleventh lens connector terminal through which an operating voltage, enabling the control unit to receive the first data signal from the camera body through the fourth lens connector terminal, and to transmit the second data signal to the camera body through the fifth lens connector terminal based upon the first asynchronous signal output through the eighth lens connector terminal and the first clock signal input through the third lens connector terminal and also enabling the communication unit to transmit the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; an interior angle formed by the contact area of the first lens connector terminal and the contact area of the eleventh lens connector terminal at the mount center point is largest among interior angles, each formed by the contact areas of any two lens connector terminals among the plurality of lens connector terminals at the mount center point; an interior angle formed by the contact area of the third lens connector terminal and the contact area of the eleventh lens connector terminal at the mount center point is smaller than an interior angle formed by the contact area of any lens connector terminal among the first lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of either the first lens connector terminal or the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of the first lens connector terminal and the contact area of the eleventh lens connector terminal at the mount center point; and the drive unit and the control unit comprise a common ground portion.

According to a 2nd aspect of the present invention, in the exchangeable lens according to the 1st aspect, the common ground portion may share a wiring for ground voltage.

According to a 3rd aspect of the present invention, in the exchangeable lens according to the 1st aspect, the common ground portion may share a terminal other than a contact portion.

An exchangeable lens according to a 4th aspect of the present invention comprises: a camera lens mount unit having a mount center point, to which a camera body, with twelve body connector terminals disposed near a camera body mount unit at the camera body, is attached; a holding portion where eleven lens connector terminals, each including a contact area to come into contact with a body connector terminal, are disposed; an optical system that includes a drive target member which can be driven; a drive unit that drives the drive target member; and a communication unit to be engaged in data communication with the camera body, wherein: the eleven lens connector terminals are: a first lens connector terminal through which a drive voltage to be used to engage the drive unit in operation is provided from the camera body; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; an eleventh lens connector terminal through which an operating voltage, enabling the communication unit to receive the first data signal from the camera body through the fourth lens connector terminal, and to transmit the second data signal to the camera body through the fifth lens connector terminal based upon the first asynchronous signal output through the eighth lens connector terminal and the first clock signal input through the third lens connector terminal and also enabling the communication unit to transmit the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage; an interior angle formed by the contact area of the first lens connector terminal and the contact area of the eleventh lens connector terminal at the mount center point is largest among interior angles, each formed by the contact areas of any two lens connector terminals among the eleven lens connector terminals at the mount center point; an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point; an interior angle formed by the contact area of the third lens connector terminal and the contact area of the eleventh lens connector terminal at the mount center point is smaller than an interior angle formed by the contact area of any lens connector terminal among the first lens connector terminal and the fourth lens connector terminal through the tenth lens connector terminal and the contact area of the eleventh lens connector terminal at the mount center point; an interior angle formed by the contact area of the fourth lens connector terminal and the contact area of the eleventh lens connector terminal at the mount center point is smaller than an interior angle formed by the contact area of any lens connector terminal among the first lens connector terminal and the fifth lens connector terminal through the tenth lens connector terminal and the contact area of the eleventh lens connector terminal at the mount center point; an interior angle formed by the contact area of the fifth lens connector terminal and the contact area of the eleventh lens connector terminal at the mount center point is smaller than an interior angle formed by the contact area of any lens connector terminal among the first lens connector terminal and the sixth lens connector terminal through the tenth lens connector terminal and the contact area of the eleventh lens connector terminal at the mount center point; an interior angle formed by the contact area of the eighth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal, the ninth lens connector terminal and the tenth lens connector terminal and the contact area of the eleventh lens connector terminal at the mount center point; an interior angle formed by the contact area of the ninth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal and the tenth lens connector terminal and the contact area of the eleventh lens connector terminal at the mount center point; an interior angle formed by the contact area of the tenth lens connector terminal and the contact area of the eleventh lens connector terminal at the mount center point is smaller than an interior angle formed by the contact area of any lens connector terminal among the first lens connector terminal, the sixth lens connector terminal and the seventh lens connector terminal and the contact area of the eleventh lens connector terminal at the mount center point; an interior angle formed by the contact area of the sixth lens connector terminal and the contact area of the eleventh lens connector terminal at the mount center point is smaller than an interior angle formed by the contact area of either the first lens connector terminal or the seventh lens connector terminal and the contact area of the eleventh lens connector terminal at the mount center point; an interior angle formed by the contact area of the seventh lens connector terminal and the contact area of the eleventh lens connector terminal at the mount center point is smaller than an interior angle formed by the contact area of the first lens connector terminal and the contact area of the eleventh lens connector terminal at the mount center point; and the interior angle formed by the contact area of the first lens connector terminal and the contact area of the seventh lens connector terminal at the mount center point is approximately twice the interior angle formed by contact areas of any two lens connector terminals disposed next to each other among the third lens connector terminal through the twelfth lens connector terminal at the mount center point.

According to a 5th aspect of the present invention, in the exchangeable lens according to the 4th aspect, it is preferable that an area, where a ground terminal among the body connector terminals is to be positioned while a voltage is supplied from the camera body through the eleventh lens connector terminal, ranges between the first lens connector terminal and the seventh lens connector terminal along a circumference of a circle centered on the mount center point.

An exchangeable lens according to a 6th aspect of the present invention comprises: a camera lens mount unit having a mount center point, to which a camera body, with twelve body connector terminals disposed near a camera body mount unit at the camera body, is attached; a holding portion where eleven lens connector terminals, each including a contact area to come into contact with a body connector terminal, are disposed; an optical system that includes a drive target member which can be driven; a drive unit that drives the drive target member; and a communication unit to be engaged in data communication with the camera body, wherein: the eleven lens connector terminals are: a first lens connector terminal through which a drive voltage to be used to engage the drive unit in operation is provided from the camera body; a second lens connector terminal that functions as a ground terminal corresponding to the drive voltage; a third lens connector terminal through which a first clock signal from the camera body is input; a fourth lens connector terminal through which a first data signal from the camera body is input in synchronization with the first clock signal; a fifth lens connector terminal through which a second data signal is output to the camera body in synchronization with the first clock signal; a sixth lens connector terminal through which a second clock signal from the camera body is input; a seventh lens connector terminal through which a third data signal is output to the camera body in synchronization with the second clock signal; an eighth lens connector terminal through which a first asynchronous signal that is not synchronous with the first clock signal or the second clock signal is output to the camera body; a ninth lens connector terminal through which a second asynchronous signal that is not synchronous with the first clock signal or the second clock signal is input from the camera body; a tenth lens connector terminal through which a third asynchronous signal that is not synchronous with the first clock signal or the second clock signal is output to the camera body; and an eleventh lens connector terminal through which an operating voltage, enabling the communication unit to receive the first data signal from the camera body through the fourth lens connector terminal, and to transmit the second data signal to the camera body through the fifth lens connector terminal based upon the first asynchronous signal output through the eighth lens connector terminal and the first clock signal input through the third lens connector terminal and also enabling the communication unit to transmit the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; an interior angle formed by the contact area of the first lens connector terminal and the contact area of the eleventh lens connector terminal at the mount center point is largest among interior angles, each formed by contact areas of any two lens connector terminals among the eleven lens connector terminals at the mount center point; an interior angle formed by the contact area of the first lens connector terminal and the contact area of the second lens connector terminal at the mount center point is smaller than an interior angle formed by the contact area of any lens connector terminal among the third lens connector terminal through the eleventh lens connector terminal and the contact area of the first lens connector terminal at the mount center point; an interior angle formed by the contact area of the first lens connector terminal and the contact area of the seventh lens connector terminal at the mount center point is smaller than an interior angle formed by the contact area of any lens connector terminal among the third lens connector terminal through the sixth lens connector terminal and the eighth lens connector terminal through the eleventh lens connector terminal and the contact area of the first lens connector terminal at the mount center point; an interior angle formed by the contact area of the first lens connector terminal and the contact area of the sixth lens connector terminal at the mount center point is smaller than an interior angle formed by the contact area of any lens connector terminal among the third lens connector terminal through the fifth lens connector terminal and the eighth lens connector terminal through the eleventh lens connector terminal and the contact area of the first lens connector terminal at the mount center point; an interior angle formed by the contact area of the first lens connector terminal and the contact area of the tenth lens connector terminal at the mount center point is smaller than an interior angle formed by the contact area of any lens connector terminal among the third lens connector terminal through the fifth lens connector terminal, the eighth lens connector terminal, the ninth lens connector terminal and the eleventh lens connector terminal and the contact area of the first lens connector terminal at the mount center point; an interior angle formed by the contact area of the first lens connector terminal and the contact area of the ninth lens connector terminal at the mount center point is smaller than an interior angle formed by the contact area of any lens connector terminal among the third lens connector terminal through the fifth lens connector terminal, the eighth lens connector terminal and the eleventh lens connector terminal and the contact area of the first lens connector terminal at the mount center point; an interior angle formed by the contact area of the first lens connector terminal and the contact area of the eighth lens connector terminal at the mount center point is smaller than an interior angle formed by the contact area of any lens connector terminal among the third lens connector terminal through the fifth lens connector terminal and the eleventh lens connector terminal and the contact area of the first lens connector terminal at the mount center point; an interior angle formed by the contact area of the first lens connector terminal and the contact area of the fifth lens connector terminal at the mount center point is smaller than an interior angle formed by the contact area of any lens connector terminal among the third lens connector terminal, the fourth lens connector terminal and the eleventh lens connector terminal and the contact area of the first lens connector terminal at the mount center point; an interior angle formed by the contact area of the first lens connector terminal and the contact area of the fourth lens connector terminal at the mount center point is smaller than an interior angle formed by the contact area of either the third lens connector terminal or the eleventh lens connector terminal and the contact area of the first lens connector terminal at the mount center point; an interior angle formed by the contact area of the first lens connector terminal and the contact area of the third lens connector terminal at the mount center point is smaller than an interior angle formed by the contact area of the first lens connector terminal and the contact area of the eleventh lens connector terminal at the mount center point; and the interior angle formed by the contact area of the third lens connector terminal and the contact area of the eleventh lens connector terminal at the mount center point is approximately twice the interior angle formed by contact areas of any two lens connector terminals disposed next to each other among the first lens connector terminal through the tenth lens connector terminal at the mount center point.

According to a 7th aspect of the present invention, in the exchangeable lens according to the 6th aspect, it is preferable that an area, where a ground terminal among the body connector terminals is to be positioned while a voltage is supplied from the camera body through the eleventh lens connector terminal, ranges between the third lens connector terminal and the eleventh lens connector terminal along a circumference of a circle centered on the mount center point.

An exchangeable lens according to an 8th aspect of the present invention comprises: a camera lens mount unit having a mount center point, to which a camera body, with twelve body connector terminals disposed near a camera body mount unit at the camera body, is attached; a holding portion where twelve contact areas, each coming into contact with a body connector terminal, are disposed; an optical system that includes a drive target member which can be driven; and a drive unit that drives the drive target member, wherein: the twelve contact areas are: a first contact area through which a drive voltage to be used to engage the drive unit in operation is provided from the camera body; a second contact area that is grounded corresponding to the drive voltage; a third contact area through which a first clock signal from the camera body is input; a fourth contact area terminal through which a first data signal from the camera body is input in synchronization with the first clock signal; a fifth contact area through which a second data signal is output to the camera body in synchronization with the first clock signal; a sixth contact area through which a second clock signal from the camera body is input; a seventh contact area through which a third data signal is output to the camera body in synchronization with the second clock signal; an eighth contact area through which a first asynchronous signal that is not synchronous with the first clock signal or the second clock signal is output to the camera body; a ninth contact area through which a second asynchronous signal that is not synchronous with the first clock signal or the second clock signal is input from the camera body; a tenth contact area through which a third asynchronous signal that is not synchronous with the first clock signal or the second clock signal is output to the camera body; an eleventh contact area through which an operating voltage, in order to receive the first data signal from the camera body through the fourth contact area and to transmit the second data signal to the camera body through the fifth contact area based upon the first asynchronous signal output through the eighth contact area and the first clock signal input through the third contact area, and also in order to transmit the third data signal to the camera body through the seventh contact area based upon the second asynchronous signal input through the ninth contact area, the third asynchronous signal output through the tenth contact area, and the second clock signal input through the sixth contact area, is provided from the camera body; and a twelfth contact area that is grounded corresponding to the operating voltage; an interior angle formed by the first contact area and the eleventh contact area at the mount center point is largest among interior angles, each formed by any two contact areas among the twelve contact areas at the mount center point; an interior angle formed by the eleventh contact area and the twelfth contact area at the mount center point is smaller than an interior angle formed by any one contact area among the first contact area through the tenth contact area and the eleventh contact area at the mount center point; an interior angle formed by the third contact area and the eleventh contact area at the mount center point is smaller than an interior angle formed by any one contact area among the first contact area, the second contact area and the fourth contact area through the tenth contact area and the eleventh contact area at the mount center point; an interior angle formed by the fourth contact area and the eleventh contact area at the mount center point is smaller than an interior angle formed by any one contact area among the first contact area, the second contact area and the fifth contact area through the tenth contact area and the eleventh contact area at the mount center point; an interior angle formed by the fifth contact area and the eleventh contact area at the mount center point is smaller than an interior angle formed by any one contact area among the first contact area, the second contact area and the sixth contact area through the tenth contact area and the eleventh contact area at the mount center point; an interior angle formed by the eighth contact area and the eleventh contact area at the mount center point is smaller than an interior angle formed by any one contact area among the first contact area, the second contact area, the sixth contact area, the seventh contact area, the ninth contact area, and the tenth contact area and the eleventh contact area at the mount center point; an interior angle formed by the ninth contact area and the eleventh contact area at the mount center point is smaller than an interior angle formed by any one contact area of the first contact area, the second contact area, the sixth contact area, the seventh contact area and the tenth contact area and the eleventh contact area at the mount center point; an interior angle formed by the tenth contact area and the eleventh contact area at the mount center point is smaller than an interior angle formed by any one contact area among the first contact area, the second contact area, the sixth contact area, and the seventh contact area and the eleventh contact area at the mount center point; an interior angle formed by the sixth contact area and the eleventh contact area at the mount center point is smaller than an interior angle formed by any one contact area among the first contact area, the second contact area, and the seventh contact area and the eleventh contact area at the mount center point; an interior angle formed by the seventh contact area and the eleventh contact area at the mount center point is smaller than an interior angle formed by any one contact area of either the first contact area or the second contact area and the eleventh contact area at the mount center point; an interior angle formed by the second contact area and the eleventh contact area at the mount center point is smaller than an interior angle formed by the first contact area and the eleventh contact area at the mount center point; and the exchangeable lens comprises eleven lens connector terminals that are a first lens connector terminal that includes the first contact area, a second lens connector terminal that includes the second contact area and the twelfth contact area, a third lens connector terminal that includes the third contact area, a fourth lens connector terminal that includes the fourth contact area, a fifth lens connector terminal that includes the fifth contact area, a sixth lens connector terminal that includes the sixth contact area, a seventh lens connector terminal that includes the seventh contact area, an eighth lens connector terminal that includes the eighth contact area, a ninth lens connector terminal that includes the ninth contact area, a tenth lens connector terminal that includes the tenth contact area, and an eleventh lens connector terminal that includes the eleventh contact area.

According to a 9th aspect of the present invention, in the exchangeable lens according to the 8th aspect of the present invention, the second lens connector terminal may comprise a first connector portion that is exposed to a surface of the holding portion and electrically connects the second contact area with the twelfth contact area.

According to a 10th aspect of the present invention, in the exchangeable lens according to the 9th aspect, the first connector portion may comprise a non-contact area that does not contact any of the twelve body connector terminals when the camera body is coupled to the camera lens mount unit.

According to an 11th aspect of the present invention, in the exchangeable lens according to the 8th aspect, the second lens connector terminal may comprise a second connector portion that connects the second contact area with the twelfth contact area in a housing of the exchangeable lens.

DESCRIPTION OF PREFERRED EMBODIMENTS (First Embodiment)

Figure 1:
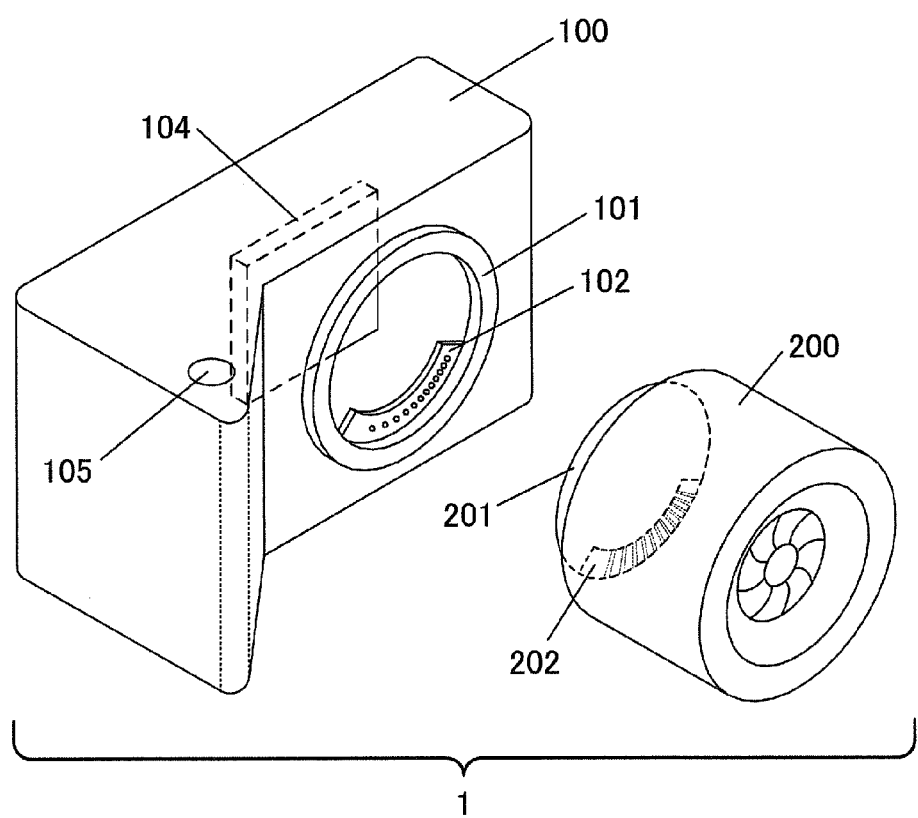
FIG. 1 is a perspective of a camera system compatible with exchangeable lenses, achieved in a first embodiment of the present invention.

FIG. 1 is a perspective of a camera system compatible with exchangeable lenses, achieved in the first embodiment of the present invention. It is to be noted that FIG. 1 only shows the units and devices relevant to the present invention and that an illustration and an explanation of other units and devices are not provided. A camera system 1 comprises a camera body 100 and an exchangeable lens (photographic lens) 200 that can be detachably mounted at the camera body 100.

The camera body 100 includes a camera body mount unit 101 at which the exchangeable lens 200 is detachably mounted. A holding portion (electrical connector portion) 102, projecting out on the inner circumferential side of the camera body mount unit 101 over part of the inner circumference, with twelve body connector terminals held thereat, is disposed in an area near the camera body mount unit 101 (on the inner circumferential side of the camera body mount unit 101).

In addition, a camera lens mount unit 201, corresponding to the camera body mount unit 101, at which the camera body 100 is detachably engaged, is disposed at the exchangeable lens 200. A holding portion (electrical connector portion) 202, projecting out on the inner circumferential side of the camera body mount unit 201 over part of the inner circumference, with eleven lens connector terminals held thereat, is disposed in an area near the camera lens mount unit 201 (on the inner circumferential side of the camera lens mount unit 201).

As the exchangeable lens 200 is engaged with the camera body 100, the plurality of body connector terminals held at the holding portion 102 (to be described in detail later) become electrically and physically connected with the plurality of lens connector terminals held at the holding portion 202 (to be described in detail later). These terminals are used to provide power from the camera body 100 to the exchangeable lens 200 and to exchange signals between the camera body 100 and the exchangeable lens 200.

An image sensor 104 is disposed inside the camera body 100 at a position rearward relative to the camera body mount unit 101. A button 105, functioning as an input device, is disposed on the top side of the camera body 100. The user is able to issue a photographing instruction, a photographing condition setting instruction or the like to the camera body 100 by operating an input device such as the button 105.

Figure 2:
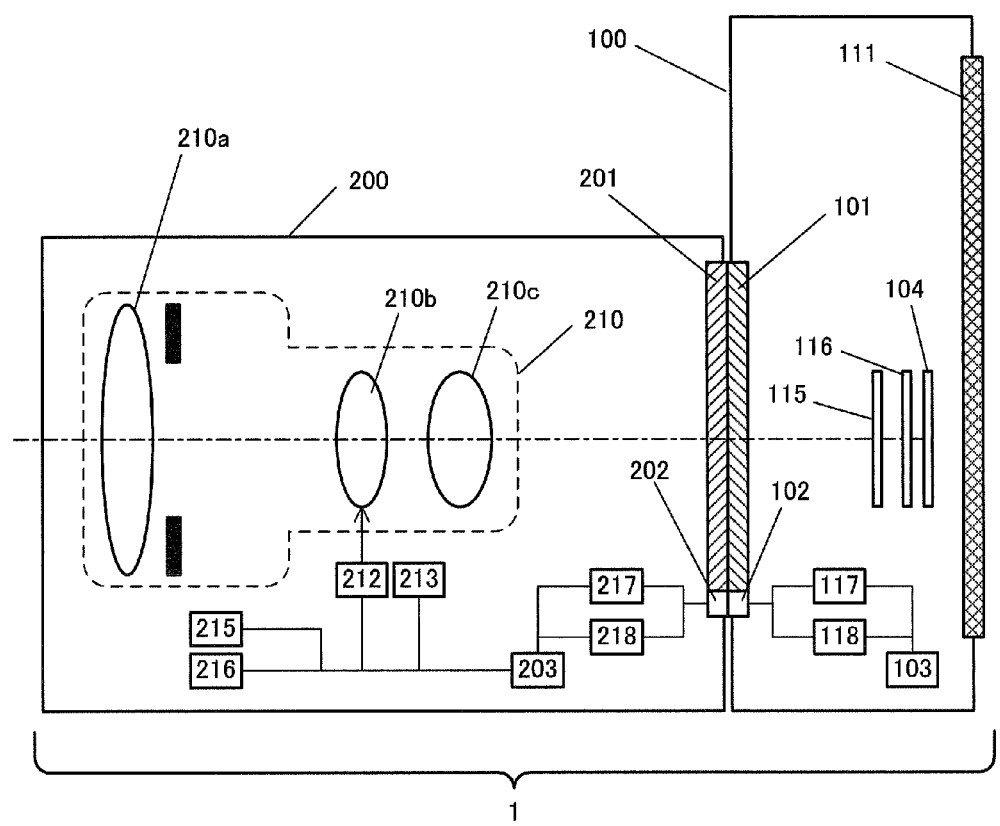
FIG. 2 is a sectional view of the camera system compatible with exchangeable lenses, achieved in the first embodiment of the present invention.

FIG. 2 is a sectional view of the camera system 1 compatible with exchangeable lenses achieved by adopting the present invention. The exchangeable lens 200 includes an image forming optical system 210 via which a subject image is formed. The image forming optical system 210 is constituted with a plurality of lenses 210a through 210c. The plurality of lenses 210a through 210c includes a focusing lens 210b.

A lens control unit 203, which controls the various components constituting the exchangeable lens 200, is disposed inside the exchangeable lens 200. The lens control unit 203 comprises a microcomputer, its peripheral circuits and the like (none shown). A first lens-side communication unit 217, a second lens-side communication unit 218, a lens drive unit 212, a lens position detection unit 213, a ROM 215 and a RAM 216 are connected to the lens control unit 203.

The first lens-side communication unit 217 and the second lens-side communication unit 218 exchange data with the camera body 100 via terminals at the holding portions 102 and 202. The first lens-side communication unit 217 and the second lens-side communication unit 218 each function as a communication interface for the exchangeable lens 200. The lens control unit 203 engages in various types of communication (hotline communication and command data communication) with the camera body 100 (with a body control unit 103 to be described in detail later) via these communication interfaces.

The lens drive unit 212, which includes an actuator such as a stepping motor, drives the focusing lens 210b in response to a signal input to the lens drive unit 212. The lens position detection unit 213 detects the position of the focusing lens 210b by, for instance, counting the number of signal pulses input to the stepping motor in the lens drive unit 212. It may instead detect the position of the focusing lens 210b via a distance encoder or the like of the known art disposed at the exchangeable lens 200.

It is to be noted that a drive target member other than the focusing lens 210b described above may be disposed in the exchangeable lens 200. For instance, a zoom lens, which is allowed to move along the optical axis of the exchangeable lens 200 (the image forming optical system 210), as is the focusing lens 210b, may be included in the exchangeable lens 200, together with a mechanism (widely known as a power zoom mechanism) that electrically drives the zoom lens. In addition, a blur correction mechanism equipped with a blur correction lens, movable along directions that include directional components (X and Y direction components) perpendicular to the optical axis of the image forming optical system 210, which corrects image blur by driving the blur correction lens, may be disposed in the exchangeable lens 200. Furthermore, an aperture drive mechanism for controlling drive of an aperture member (aperture blades) that can be moved so as to alter the size of an aperture opening through which a subject light flux passes, may be disposed in the exchangeable lens 200. The lens control unit 203 in an exchangeable lens that includes such drive target members controls the drive and the position detection executed for the individual drive target members, i.e., the blur correction lens, the aperture member and the zoom lens, via the lens drive unit 212 and the lens position detection unit 213.

The ROM 215 is a nonvolatile storage medium into which a specific control program, to be executed by the lens control unit 203, and the like are stored in advance. The RAM 216 is a volatile storage medium used by the lens control unit 203 as a storage area where various types of data are stored.

A shutter 115, via which the exposure conditions at the image sensor 104 are controlled, and an optical filter 116, which is an integrated filter achieved by combining an optical low pass filter and an infrared cut-off filter, are disposed in front of the image sensor 104. The subject light having been transmitted through the image forming optical system 210 enters the image sensor 104 via the shutter 115 and the filter 116.

The body control unit 103, engaged in control of the various components of the camera body 100, is disposed inside the camera body 100. The body control unit 103 is constituted with a microcomputer, a RAM, peripheral circuits and the like (none shown).

A first body-side communication unit 117 and a second body-side communication unit 118 are connected to the body control unit 103. The first body-side communication unit 117 is connected to the holding portion 102 and is able to exchange data with the first lens-side communication unit 217. The second body-side communication unit 118 is likewise able to exchange data with the second lens-side communication unit 218. Namely, the first body-side communication unit 117 and the second body-side communication unit 118 each function as a body-side communication interface. The body control unit 103 engages in various types of communication (hotline communication and command data communication) with the exchangeable lens 200 (with the lens control unit 203) via these communication interfaces.

A display device 111 constituted with an LCD panel or the like is disposed at the rear surface of the camera body 100. The body control unit 103 brings up on display at the display device 111a subject image (referred to as a live view image) based upon an output from the image sensor 104 or various types of menu screens enabling selection of photographing conditions and the like.

(Description of the Holding Portions 102 and 202)

Figure 3:
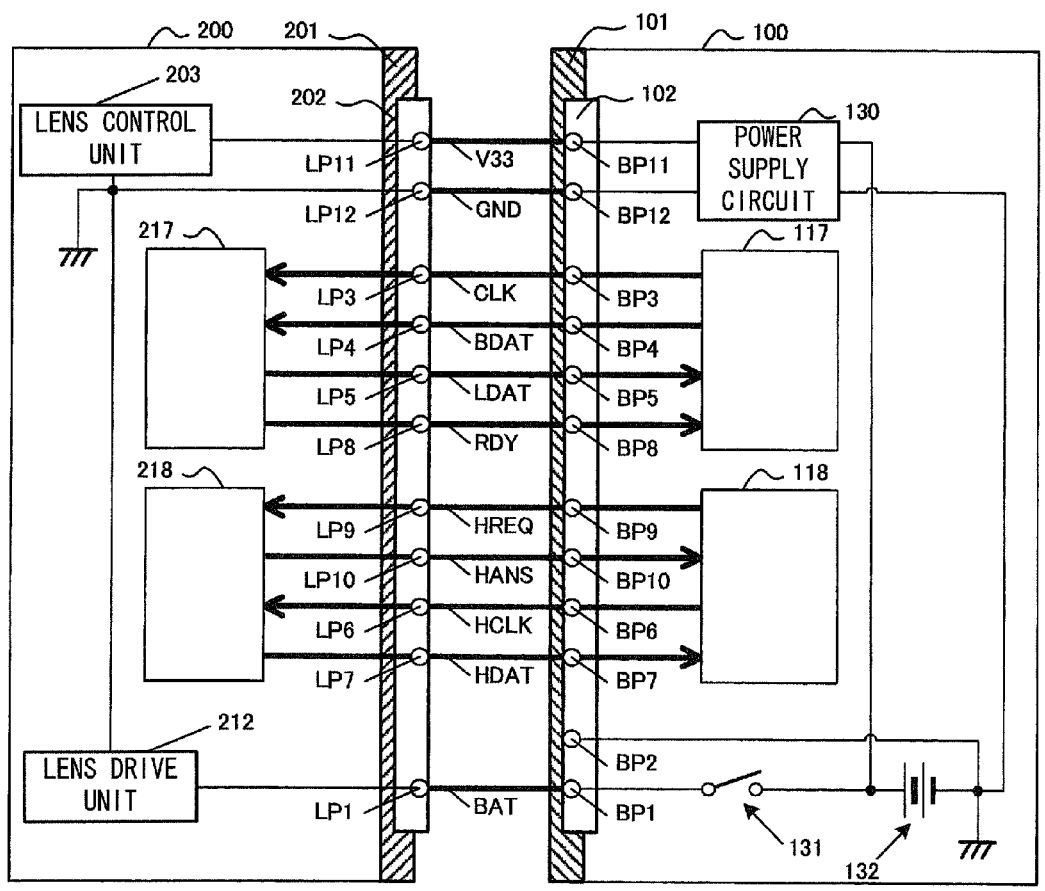
FIG. 3 is a schematic diagram showing in detail holding portions.

FIG. 3 is a schematic diagram showing structural details of the holding portions 102 and 202. As shown in FIG. 3, twelve body connector terminals SP1 through BP12 are present at the holding portion 102. In addition, eleven lens connector terminals LP1 and LP3 through LP12, which respectively correspond to eleven body connector terminals BP1 and BP3 through BP12 among the twelve body connector terminals BP1 through BP12, are disposed at the holding portion 202.

A secondary battery 132, from which a voltage within a predetermined range can be provided, is installed in the camera body 100. Various units present in the camera body 100 (e.g., the body control unit 103, the first body side communication unit 117 and the second body side communication unit 118) operate on the voltage provided from the secondary battery 132. It is to be noted that instead of engaging the various units in the camera body 100 in operation by directly sourcing the voltage from the secondary battery 132, they may be engaged in operation on a voltage that has been lowered via a series regulator, a switching regulator or the like of the known art.

A positive electrode and a negative electrode of the secondary battery 132 are connected to a power supply circuit 130 disposed in the camera body 100. The eleventh body connector terminal BP11 and the twelfth body connector terminal BP12 are connected to this power supply circuit 130. Based upon the voltage provided from the secondary battery 132, the power supply circuit 130 provides an operating voltage on which various units in the exchangeable lens 200, except for the lens drive unit 212, operate, via the eleventh body connector terminal BP11. Namely, an operating voltage on which the various units in the exchangeable lens 200 (including the first lens-side communication unit 217 and the second lens-side communication unit 218), excluding the lens drive unit 212, operate is supplied through the eleventh body connector terminal BP11 and the eleventh lens connector terminal LP11.

It is to be noted that while FIG. 3 only illustrates the connection between the eleventh lens connector terminal LP11 and the lens control unit 203, the eleventh lens connector terminal LP11 is actually connected to the first lens-side communication unit 217 and the second lens-side communication unit 218 and thus, the operating voltage is also supplied to these communication units through the eleventh lens connector terminal LP11. In addition, while FIG. 3 only illustrates the connection between the twelfth lens connector terminal LP12 and the lens control unit 203, the twelfth lens connector terminal LP12 is also connected to the first lens-side communication unit 217 and the second lens-side communication unit 218.

While a specific range (e.g., a voltage range from 3 to 4 v), defined by a minimum voltage value and a maximum voltage value, is assumed for the voltage value representing the level of voltage that can be provided to the eleventh body connector terminal BP11, the voltage value of the voltage typically provided to the eleventh body connector terminal BP11 is close to the median of the maximum voltage value and the minimum voltage value. The value of the electric current provided from the camera body 100 to the exchangeable lens 200 in conjunction with the operating voltage will be in the range of approximately several tens of mA to several hundreds of mA in a power ON state.

The twelfth body connector terminal BP12 is a ground terminal that corresponds to the operating voltage provided to the eleventh body connector terminal BP11, and is connected to the negative electrode of the secondary battery 132 within the power supply circuit 130. Namely, the twelfth body connector terminal BP12 and the twelfth lens connector terminal LP12 are ground terminals that correspond to the operating voltage.

In the following description, the signal line formed with the eleventh body connector terminal BP11 and the eleventh lens connector terminal LP11 will be referred to as a signal line V33. The signal line formed with the twelfth body connector terminal BP12 and the twelfth lens connector terminal LP12 will be referred to as a signal line GND. The eleventh lens connector terminal LP11, the twelfth lens connector terminal LP12, the eleventh body connector terminal BP11 and the twelfth body connector terminal BP12 are power supply system connector terminals used to provide power from the camera body 100 to the exchangeable lens 200.

The third body connector terminal BP3, the fourth body connector terminal BP4, the fifth body connector terminal BP5 and the eighth body connector terminal BP8 are connected to the first body-side communication unit 117. The third lens connector terminal LP3, the fourth lens connector terminal LP4, the fifth lens connector terminal LP5 and the eighth lens connector terminal LP8 at the exchangeable lens 200, corresponding to the body connector terminals BP3, BP4, BP5 and BP8, are connected to the first lens-side communication unit 217. The first body-side communication unit 117 and the first lens-side communication unit 217 exchange data with each other via these terminals (communication system terminals). The communication carried out by the first body-side communication unit 117 and the first lens-side communication unit 217 will be described in detail later.

It is to be noted that the signal line formed with the third body connector terminal BP3 and the third lens connector terminal LP3 will be referred to as a signal line CLK. In addition, the signal line formed with the fourth body connector terminal BP4 and the fourth lens connector terminal LP4 will be referred to as a signal line BDAT, the signal line formed with the fifth body connector terminal BP5 and the fifth lens connector terminal LP5 will be referred to as a signal line LDAT and the signal line formed with the eighth body connector terminal BP8 and the eighth lens connector terminal LP8 will be referred to as a signal line RDY.

The ninth body connector terminal BP9, the tenth body connector terminal BP10, the sixth body connector terminal BP6 and the seventh body connector terminal BP7 are connected to the second body-side communication unit 118. The ninth lens connector terminal LP9, the tenth lens connector terminal LP10, the sixth lens connector terminal LP6 and the seventh lens connector terminal LP7 at the exchangeable lens 200, corresponding to these body connector terminals, are connected to the second lens-side communication unit 218. The second lens-side communication unit 218 transmits data to the second body-side communication unit 118 via these terminals (communication system terminals). The communication carried out by the second body-side communication unit 118 and the second lens-side communication unit 218 will be described in detail later.

It is to be noted that the signal line formed with the ninth body connector terminal BP9 and the ninth lens connector terminal LP9 will be referred to as a signal line HREQ. In addition, the signal line formed with the tenth body connector terminal BP10 and the tenth lens connector terminal LP10 will be referred to as a signal line HANS, the signal line formed with the sixth body connector terminal BP6 and the sixth lens connector terminal LP6 will be referred to as a signal line FICLK and the signal line formed with the seventh body connector terminal BP7 and the seventh lens connector terminal LP7 will be referred to as a signal line HDAT.

The first body connector terminal BP1 is connected to the positive electrode of the secondary battery 132 via a switch 131. In addition, the second body connector terminal BP2 is connected to the negative electrode of the secondary battery 132. The secondary battery 132 provides a drive voltage to be used to drive the lens drive unit 212, to the first body connector terminal BP1. In other words, the drive voltage for the lens drive unit 212 is supplied via the first body connector terminal BP1 and the first lens connector terminal LP1. While the voltage value indicating the level of voltage that can be provided to the first body connector terminal BP1 assumes a range defined by a minimum voltage value and a maximum voltage value, the voltage value is never smaller than the voltage value indicating the level of voltage that can be provided to the eleventh body connector terminal BP11 assuming its own specific voltage value range as has been explained earlier. For instance, the maximum voltage value indicating the highest level of voltage that can be provided to the first body connector terminal BP1 may be several times the maximum voltage value indicating the highest level of voltage that can be supplied to the eleventh body connector terminal BP11. In other words, the voltage value indicating the level of voltage provided to the first body connector terminal BP1 is always different from the voltage value indicating the level of voltage provided to the eleventh body connector terminal BP11. It is to be noted that the voltage value indicating the level of voltage provided to the first body connector terminal BP1 under normal circumstances is close to the median of the maximum voltage value and the minimum voltage value assumed for the first body connector terminal BP1. The value of the electric current provided from the camera body 100 to the exchangeable lens 200 in conjunction with the drive voltage will be in the range of approximately several tens of mA to several A in the power ON state.

The second body connector terminal BP2, which is a ground terminal that corresponds to the drive voltage provided to the first body connector terminal BP1 is connected to the negative electrode of the secondary battery 132. Namely, the second body connector terminal BP2 is a ground terminal that corresponds to the drive voltage described above. A terminal corresponding to this second body connector terminal BP2 is not present in the holding portion 202 at the exchangeable lens 200. This means that when the camera body 100 and the exchangeable lens 200 are engaged with each other, the second body connector terminal BP2 is left in an open state.

In the following description, the signal line formed with the first body connector terminal BP1 and the first lens connector terminal LP1 will be referred to as a signal line BAT. The first body connector terminal BP1 and the second body connector tem final BP2 are power supply system terminals used to provide power from the camera body 100 to the exchangeable lens 200.

The first lens connector terminal LP1 is connected to the lens drive unit 212 in the exchangeable lens 200. The twelfth lens connector terminal LP12 is also connected to the lens drive unit 212. In other words, the lens drive unit 212 is engaged in operation on a drive voltage provided via the lens connector terminal LP1 with the twelfth lens connector terminal LP12 functioning as a ground terminal thereof. Namely, circuits such as the lens control unit 203 in the exchangeable lens 200 and drive systems such as the lens drive unit 212 share a common ground terminal.

Figure 4A:
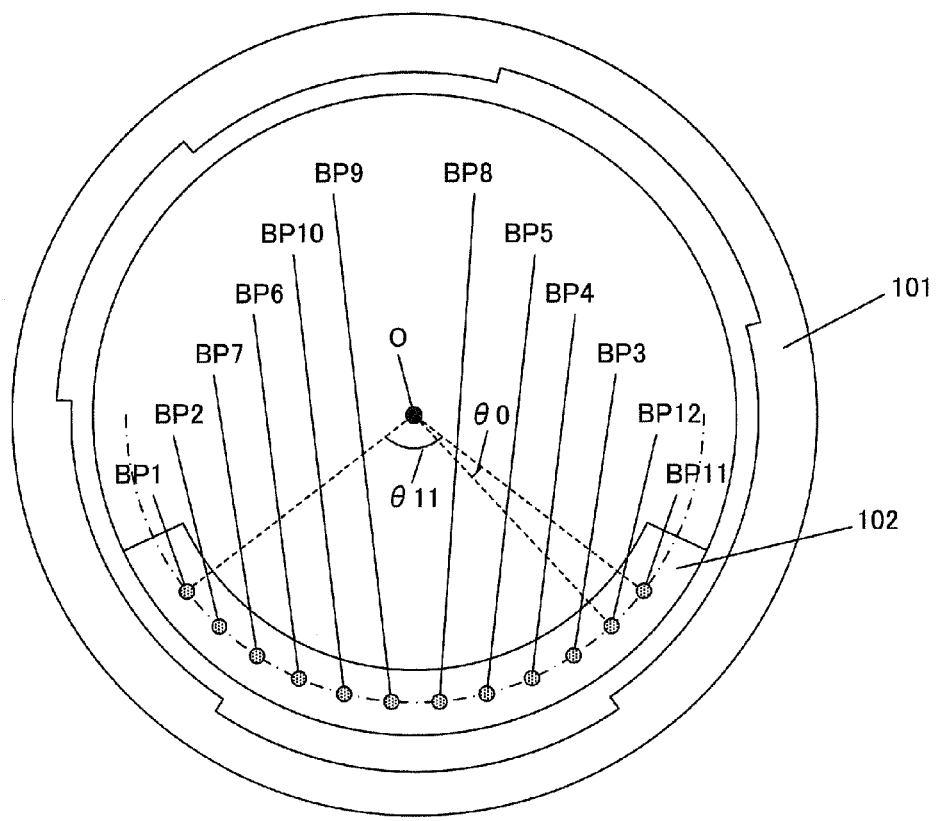
FIGS. 4A and 4B respectively show a camera body mount unit in a front view and associated holding portion in an enlarged view.
Figure 4B:
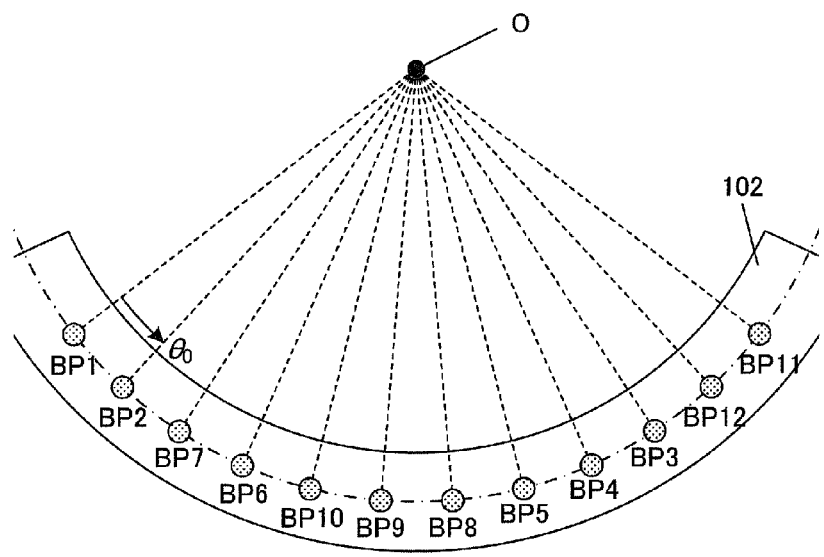
Figure 5A:
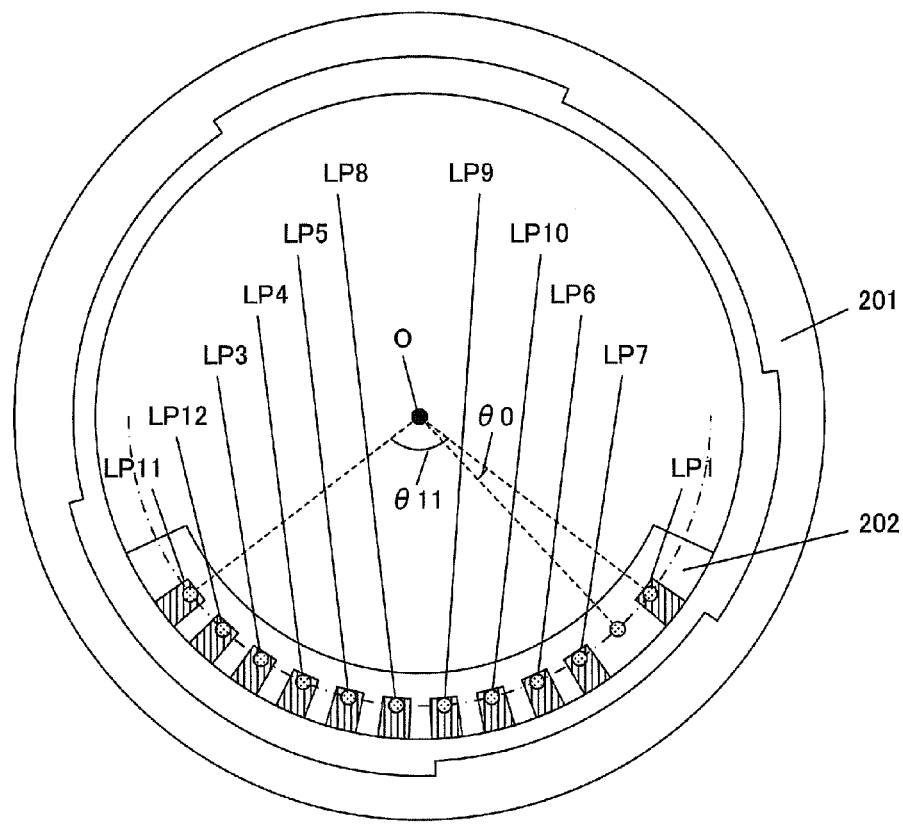
FIGS. 5A and 5B respectively show a camera lens mount unit in a front view and associated holding portion in an enlarged view.
Figure 5B:
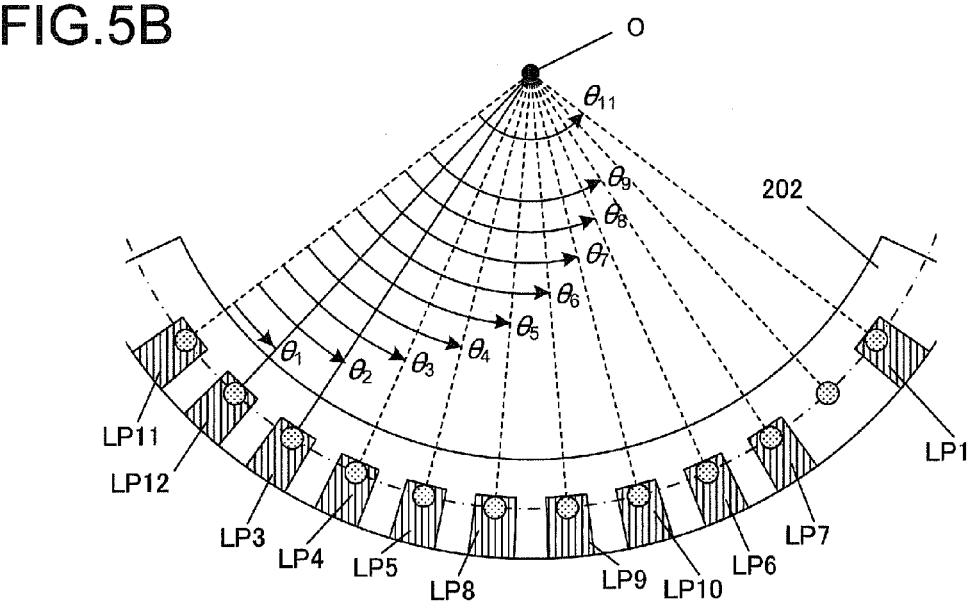

FIGS. 4A and 4B show the camera body mount unit 101 in front views. FIG. 4A shows the camera body mount unit 101 at the camera body 100 viewed from the side where the exchangeable lens 200 is present, whereas FIG. 4B shows the holding portion 102 in FIG. 4A in an enlargement. FIGS. 5A and 5B show the camera lens mount unit 201 in front views. FIG. 5A shows the camera lens mount unit 201 at the exchangeable lens 200 viewed from the side where the camera body 100 is present, whereas FIG. 5B shows the holding portion 202 in FIG. 5A in an enlargement. The mount units each assume a circular shape and the center of the circle will be referred to as a mount center point O in the following description.

As shown in FIG. 4A, the holding portion 102 is disposed at a position inward relative to the mount surface of the camera body mount unit 101 (deeper into the drawing sheet on which FIG. 4A is provided). In addition, FIG. 5 indicates that the holding portion 202 is disposed at a position further outward relative to the mount surface of the camera lens mount unit 201 (toward the person viewing FIG. 5A). The holding portion 102 and the holding portion 202 are connected as the camera body 100 and the exchangeable lens 200 are coupled by placing the mount surface of the camera body mount unit 101 in contact with the mount surface of the camera lens mount unit 201. Once the holding portions 102 and 202 are thus connected, the eleven body connector terminals BP1 and BP3 through BP12 and the eleven lens connector terminals LP1 and LP3 through LP12 disposed at the two holding portions become connected with each other. In addition, the second body connector terminal BP2 is not connected to any lens connector terminal, as explained earlier. It is to be noted that the one-point chain lines drawn over the twelve body connector terminals BP1 through BP12 and the eleven lens connector terminals LP1 and LP3 through LP12 in FIGS. 4A and 4B and FIGS. 5A and 5B indicate a locus through which the twelve body connector terminals BP1 through BP12 move when the camera body 100 is coupled with the exchangeable lens 200. Since this mount structure is of the known art, no further explanation is provided.

As shown in FIG. 4A, the twelve body connector terminals BP1 through BP12 each assume a cylindrical shape and a force imparted from a spring or the like disposed inside the holding portion 102 presses them toward the front of the camera body mount unit 101 (toward the exchangeable lens 200). In addition, as shown in FIG. 5A, the eleven lens connector terminals LP1 and LP3 through LP12 each include a substantially rectangular conductor exposed at the surface of the holding portion 202. Once the holding portion 102 is connected with the holding portion 202, the body connector terminals are each pressed against a lens connector terminal by the force imparted from the spring or the like as described above and thus, electrical continuity is achieved between the lens connector terminals and the body connector terminals. It is to be noted that the circles drawn over the eleven lens connector terminals LP1 and LP3 through LP12 in FIG. 5A and FIG. 5B indicate the positions at which the corresponding body connector terminals are pressed against the lens connector terminals.

In the following description, the particular area of each of the eleven lens connector terminals LP1 and LP3 through LP12 that comes into contact with the corresponding body connector terminal when the camera body 100 and the exchangeable lens 200 are engaged with each other will be referred to as a contact area (an area indicated by each of the circles in FIG. 5A). In addition, the phrase "when the camera body 100 and the exchangeable lens 200 are engaged with each other" is used to refer to a state in which a voltage is supplied from the eleventh body connector terminal BP11 to the eleventh lens connector terminal LP11. It is to be noted that the term "lens connector terminal" used in the description of the embodiment refers to an entire terminal that includes an electrical wiring (a lead wire, a flexible cable or the like) used to connect the substantially rectangular area (which includes the contact area) exposed at the surface of the holding portion 202, indicated as a shaded area in FIG. 5A, with the first lens-side communication unit 217 or the second lens-side communication unit 218, as well as the rectangular area itself. In addition, the areas of the lens connector terminals LP1 and LP3 through LP12 exposed at the surface of the holding portion 202, indicated as the shaded areas as explained above, may be referred to as "exposed areas" of the lens connector terminals LP1 and LP3 through LP12 in the following description. It is to be noted that the exposed areas will be described in detail later in reference to FIG. 9.

As shown in FIG. 5A, the eleven lens connector terminals LP1 and LP3 through LP12 (the exposed areas of the eleven lens connector terminals) are set in the holding portion 202 of the camera lens mount unit 201 so as to form a circular arc centered on the mount center point O and ranging along the camera lens mount unit 201 (along part of the camera lens mount unit 201 assuming a substantially circular shape on the outside). In the embodiment, the lens connector terminals LP3 through LP12 (their exposed areas), among the eleven lens connector terminals LP1 and LP3 through LP12, are disposed so that the contact areas of the lens connector terminals LP3 through LP12 are set over equal intervals. An angle θ11 defined by the circular arc, i.e., the angle formed by connecting the mount center point O, the center of the first lens connector terminal LP1 (its exposed area) and the center of the eleventh lens connector terminal LP11 (its exposed area) is approximately 105°, whereas an angle θ0 defined by the circular arc connecting one contact area to the next contact area is approximately 9.5°. In addition, the eleven lens connector terminals LP1 and LP3 through LP12 in the embodiment each assume a width of approximately 1.5 mm measured along the direction in which the circular arc ranges. Since the distance between the mount center point O and the center of the contact area in each of the lens connector terminals LP1 and LP3 through LP12 is approximately 15 mm, the distance between the centers of each two consecutive lens connector terminals, among the lens connector terminals LP3 through LP12, measured along the direction in which the circular arc ranges, is approximately 2.5 mm. Furthermore, since the lens connector terminals LP3 through LP12 achieve a width of approximately 1.5 mm measured along the direction in which the circular arc ranges, the lens connector terminals LP3 through LP12 are set apart from one another with clearances measuring approximately 1 mm along the direction in which the circular arc ranges.

It is to be noted that the width of the lens connector terminals LP1 and LP3 through LP12 (the width of their exposed areas) and the clearance between the individual lens connector terminals LP1 and LP3 through LP12 can be altered to optimal values as necessary. For instance, the width of the lens connector terminals LP1 and LP3 through LP12 (the width of their exposed areas), measured along the direction in which the circular arc ranges, may be increased or decreased in units of 1/10 mm (in units of 0.1 mm). In correspondence, the width of the clearance between the lens connector terminals, measured along the direction in which the circular arc ranges, may be adjusted to an optimal value in units of 1/10 mm (in units of 0.1 mm, e.g., ±0.2 mm).

Next, in reference to FIG. 5B, the positional relationship among the eleven lens connector terminals LP1 and LP3 through LP12 (their exposed areas) will be described. The interior angle θ11, formed by the contact area of the first lens connector terminal LP1 and the contact area of the eleventh lens connector terminal LP11 at the mount center point O, is the largest among interior angles, each formed by the contact areas of any two randomly selected lens connector terminals among the eleven lens connector terminals LP1 and LP3 through LP12 at the mount center point O.

An interior angle θ1, formed by the contact area of the eleventh lens connector terminal LP11 and the contact area of the twelfth lens connector terminal LP12 at the mount center point O, is smaller than interior angles θ2 through θ11 each formed by the contact area of a given lens connector terminal among the first lens connector terminal LP1 through the tenth lens connector terminal LP10 and the contact area of the eleventh lens connector terminal LP11 at the mount center point O. The interior angle θ2, formed by the contact area of the third lens connector terminal LP3 and the contact area of the eleventh lens connector terminal LP11 at the mount center point O, is smaller than the interior angles θ3 through θ11 each formed by the contact area of a given lens connector terminal among the first lens connector terminal LP1 and the fourth lens connector terminal LP4 through the tenth lens connector terminal LP10 and the contact area of the eleventh lens connector terminal LP11 at the mount center point O.

The interior angle θ3, formed by the contact area of the fourth lens connector terminal LP4 and the contact area of the eleventh lens connector terminal LP11 at the mount center point O, is smaller than the interior angles θ4 through θ11 each formed by the contact area of a given lens connector terminal among the first lens connector terminal LP1 and the fifth lens connector terminal LP5 through the tenth lens connector terminal LP10 and the contact area of the eleventh lens connector terminal LP11 at the mount center point O. The interior angle θ4, formed by the contact area of the fifth lens connector terminal LP5 and the contact area of the eleventh lens connector terminal LP11 at the mount center point O, is smaller than the interior angles θ5 through θ11 each formed by the contact area of a given lens connector terminal among the first lens connector terminal LP1 and the sixth lens connector terminal LP6 through the tenth lens connector terminal LP10 and the contact area of the eleventh lens connector terminal LP11 at the mount center point O.

The interior angle θ5, formed by the contact area of the eighth lens connector terminal LP8 and the contact area of the eleventh lens connector terminal LP11 at the mount center point O, is smaller than the interior angles θ6 through θ11 each formed by the contact area of a given lens connector terminal among the first lens connector terminal LP1, the sixth lens connector terminal LP6, the seventh lens connector terminal LP7, the ninth lens connector terminal LP9 and the tenth lens connector terminal LP10 and the contact area of the eleventh lens connector terminal LP11 at the mount center point O. The interior angle θ6, formed by the contact area of the ninth lens connector terminal LP9 and the contact area of the eleventh lens connector terminal LP11 at the mount center point O, is smaller than the interior angles θ7 through θ11 each formed by the contact area of a given lens connector terminal among the first lens connector terminal LP1, the sixth lens connector terminal LP6, the seventh lens connector terminal LP7 and the tenth lens connector terminal LP10 and the contact area of the eleventh lens connector terminal LP11 at the mount center point O.

The interior angle θ7, formed by the contact area of the tenth lens connector terminal LP10 and the contact area of the eleventh lens connector terminal LP11 at the mount center point O, is smaller than the interior angles θ8 through θ11 each formed by the contact area of a given lens connector terminal among the first lens connector terminal LP1, the sixth lens connector terminal LP6 and the seventh lens connector terminal LP7 and the contact area of the eleventh lens connector terminal LP11 at the mount center point O. The interior angle θ8, formed by the contact area of the sixth lens connector terminal LP6 and the contact area of the eleventh lens connector terminal LP11 at the mount center point O, is smaller than the interior angles θ9 through θ11 each formed by the contact area of either the first lens connector terminal LP1 or the seventh lens connector terminal LP7 and the contact area of the eleventh lens connector terminal LP11 at the mount center point O.

The interior angle θ9, formed by the contact area of the seventh lens connector terminal LP7 and the contact area of the eleventh lens connector terminal LP11 at the mount center point O, is smaller than the interior angle θ11 formed by the contact area of the first lens connector terminal LP1 and the contact area of the eleventh lens connector terminal LP11 at the mount center point O.

The interior angle formed by the contact area of the first lens connector terminal LP1 and the contact area of the seventh lens connector terminal LP7 at the mount center point O is approximately twice the interior angle formed by the contact areas of any two lens connector terminals disposed next to each other among the third lens connector terminal LP3 through the twelfth lens connector terminal LP12 at the mount center point O. The "two lens connector terminals disposed next to each other" in this instance are two lens connector terminals set side-by-side among the eleven lens connector terminals disposed on the circumference of a circle centered on the mount center point O, such as the eleventh lens connector terminal LP11 and the twelfth lens connector terminal LP12, the fifth lens connector terminal LP5 and the eighth lens connector terminal LP8, or the tenth lens connector terminal LP10 and the sixth lens connector terminal LP6 in FIG. 5A. It is to be noted that when the camera body 100 and the exchangeable lens 200 are engaged with each other (i.e., when a voltage is supplied from the eleventh body connector terminal BP11 to the eleventh lens connector terminal LP11), the second body connector terminal is positioned between the first lens connector terminal LP1 and the seventh lens connector terminal LP7.

The eleven lens connector terminals LP1 and LP3 through LP12 (their exposed areas) are disposed at the holding portion 202 so as to achieve the positional relationship described above. It is to be noted that the twelfth lens connector terminal LP12, functioning as a ground terminal for the eleventh lens connector terminal LP11 through which a source voltage (the operating voltage described earlier) is provided among the power supply system terminals, is disposed between the communication system terminals, i.e., the third lens connector terminal LP3 through the tenth lens connector terminal. LP10, and the eleventh lens connector terminal LP11, so as to minimize the extent to which the power supply system terminals (signal lines) adversely affect the communication system terminals (signal lines).

The signal line through which the source voltage is supplied (the signal line running through the eleventh lens connector terminal LP11) is bound to manifest a significant voltage change as the load on the source voltage recipient fluctuates. Such a significant voltage change may adversely affect the communication system signal lines. This adverse effect is minimized in the embodiment by disposing the ground terminal (the twelfth lens connector terminal LP12), at which the voltage tends to remain stable compared to the power supply terminal (the eleventh lens connector terminal LP11), between the communication system terminals (the third lens connector terminal LP3 through the tenth lens connector terminal LP10) and the power supply terminal (the eleventh lens connector terminal LP11).

While the group of lens connector terminals connected to the first lens-side communication unit 217, i.e., the third lens connector terminal LP3, the fourth lens connector terminal LP4, the fifth lens connector terminal LP5 and the eighth lens connector terminal LP8, is disposed next to the group of lens connector terminals connected to the second lens-side communication unit 218, i.e., the ninth lens connector terminal LP9, the tenth lens connector terminal LP10, the sixth lens connector terminal LP6 and the seventh lens connector terminal LP7, none of the third lens connector terminal LP3, the fourth lens connector terminal LP4 and the fifth lens connector terminal LP5, connected to the first lens-side communication unit 217, and the sixth lens connector terminal LP6 and the seventh lens connector terminal LP7, connected to the second lens-side communication unit 218, occupies a position next to a terminal connected to a different (other) communication unit (217 or 218). In other words, the eighth lens connector terminal LP8, the ninth lens connector terminal LP9 and the tenth lens connector terminal LP10 are disposed in close proximity to each other, each occupying a position close to a terminal connected to the different (other) communication unit. This positional arrangement is adopted since signals that are not synchronous with a clock signal are transmitted through the eighth lens connector terminal LP8, the ninth lens connector terminal LP9 and the tenth lens connector terminal LP10, as will be described in detail later. A signal that is not synchronous with a clock signal manifests less change compared to the clock signal or a signal synchronous with the clock signal, e.g., a signal manifesting a status change of approximately 1 kHz to several kHz per unit time. Under normal circumstances, a clock signal and a signal synchronous with the clock signal manifest significant changes per unit time of up to several MHz (e.g., a clock signal may manifest an 8 MHz change and a data signal synchronous with the clock signal may manifest a 4 MHz change (depending upon the data volume)) and thus, such changes tend to result in noise. Accordingly, it is desirable to dispose each of the terminals through which a clock signal or a signal synchronous with the clock signal is transmitted away from any terminal connected to the different (other) communication unit, so as to minimize the adverse effect on communication. In the embodiment, such a positional arrangement is achieved by disposing the group of terminals (the eighth lens connector terminal LP8, the ninth lens connector terminal LP9 and the tenth lens connector terminal LP10), through which signals asynchronous with the clock signal are transmitted, between the group of terminals (the third lens connector terminal LP3, the fourth lens connector terminal LP4 and the fifth lens connector terminal LP5) through which a clock signal and signals synchronous with the clock signal are transmitted in the first lens-side communication unit 217 and the group of terminals (the sixth lens connector terminal LP6 and the seventh lens connector terminal LP7) through which a clock signal and a signal synchronous with a clock signal are transmitted in the second lens-side communication unit 218.

It is to be noted that the positional arrangement with which the twelve body connector terminals BP1 through BP12 are disposed in the holding portion 102 at the camera body 100, as shown in FIGS. 4A and 4B, is similar to the positional arrangement adopted for the eleven lens connector terminals LP1 and LP3 through LP12 at the exchangeable lens 200, and for this reason, a repeated explanation is not provided. It is also to be noted that the camera body mount unit 101 adopts a mount structure widely known as a bayonet mount system, whereby it is positioned so as to face opposite the camera lens mount unit 201 and is then rotated relative to the camera lens mount unit 201 until it becomes engaged with the camera lens mount unit 201, as FIGS. 1, 4A and 4B, 5A and 5B clearly illustrate. For this reason, the body connector terminals BP1 through BP12 are disposed side-by-side along a direction opposite from the direction in which the lens connector terminals LP1 and LP3 through LP12 are disposed side-by-side, as shown in FIGS. 4A and 5A. While the eleventh lens connector terminal LP11 is disposed at the left end and the first lens connector terminal LP1 is disposed at the right end in FIG. 5A, the eleventh body connector terminal BP11 is disposed at the right end and the first body connector terminal BP1 is disposed at the left end in FIG. 4.

(Description of Command Data Communication)

The lens control unit 203 concurrently receives control data from the first body-side communication unit 117 and transmits response data to the first body-side communication unit 117 over predetermined first cycles (16 ms cycles in the embodiment) via the third lens connector terminal LP3, the fourth lens connector terminal LP4, the fifth lens connector terminal LP5 and the eighth lens connector terminal LP8, i.e., via the signal lines CLK, BDAT, LDAT and RDY, by controlling the first lens-side communication unit 217. The following is a detailed description of the communication carried out by the first lens-side communication unit 217 and the first body-side communication unit 117.

It is to be noted that in the description of the embodiment, the communication carried out by the first lens-side communication unit 217 and the first body-side communication unit 117, respectively under control executed by the lens control unit 203 and the body control unit 103, will be referred to as "command data communication".

Figure 6:
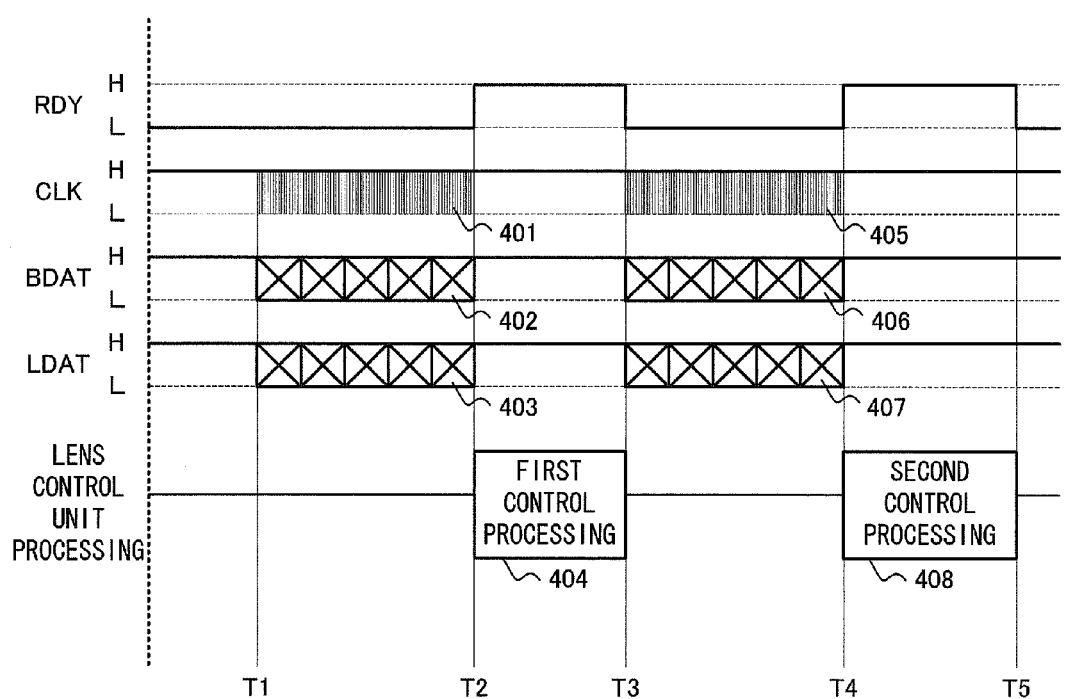
FIG. 6 is a timing chart indicating the timing with which command data communication may be executed.

FIG. 6 is a timing chart indicating the timing with which command data communication may be executed. The body control unit 103 and the first body-side communication unit 117 verify the signal level at the signal line RDY at a command data communication start (T1). The signal level at the signal line RDY indicates whether or not the first lens-side communication unit 217 is in a communication enabled state. If the first lens-side communication unit 217 is in a communication disabled state, the lens control unit 203 and the first lens-side communication unit 217 output an H (high) level signal through the eighth lens connector terminal LP8. In other words, the signal level at the signal line RDY is set to H. Until the signal line RDY holding H level shifts to L level, the body control unit 103 and the first body-side communication unit 117 do not start communication. They do not execute the next phase of processing for any communication in progress, either.

Upon verifying that the signal level at the signal line RDY is L (low) level, the body control unit 103 and the first body-side communication unit 117 output a clock signal 401 through the third body connector terminal BP3. Namely, the clock signal 401 is transmitted to the first lens-side communication unit 217 through the signal line CLK. In synchronization with the clock signal 401, the body control unit 103 and the first body-side communication unit 117 output a body-side command packet signal 402, which constitutes the first half of control data, via the fourth body connector terminal BP4. Namely, the body-side command packet signal 402 is transmitted to the first lens-side communication unit 217 via the signal line BDAT.

In addition, in synchronization with the clock signal 401 output to the signal line CLK, the lens control unit 203 and the first lens-side communication unit 217 output a lens-side command packet signal 403, which constitutes the first half of response data, via the fifth lens connector terminal LP5. Namely, the lens-side command packet signal 403 is transmitted to the first body-side communication unit 117 via the signal line LDAT.

Upon completion of the transmission of the lens-side command packet signal 403, the lens control unit 203 and the first lens-side communication unit 217 set the signal level at the signal line RDY to H (T2). The lens control unit 203 then starts first control processing 404 (which will be described later) corresponding to the contents of the body-side command packet signal 402 having been received.

Upon completing the first control processing 404, the lens control unit 203 notifies the first lens-side communication unit 217 of the completion of the first control processing 404. In response to this notification, the first lens-side communication unit 217 outputs an L-level signal via the eighth lens connector terminal LP8. In other words, the signal level at the signal line RDY is set to L (T3). In response to the signal level shift, the body control unit 103 and the first body-side communication unit 117 output a clock signal 405 through the third body connector terminal BP3. Namely, the clock signal 405 is transmitted to the first lens-side communication unit 217 via the signal line CLK.

In synchronization with the clock signal 405, the body control unit 103 and the first body-side communication unit 117 output a body-side data packet signal 406, which constitutes the second half of the control data, via the fourth body connector terminal BP4. Namely, the body-side data packet signal 406 is transmitted to the first lens-side communication unit 217 via the signal line BDAT.

In addition, in synchronization with the clock signal 405 output to the signal line CLK, the lens control unit 203 and the first lens-side communication unit 217 output a lens-side data packet signal 407, which constitutes the second half of the response data, via the fifth lens connector terminal LP5. Namely, the lens-side data packet signal 407 is transmitted to the first body-side communication unit 117 via the signal line LDAT.

Upon completion of the transmission of the lens-side data packet signal 407, the lens control unit 203 and the first lens-side communication unit 217 set the signal level at the signal line RDY to H again (T4). The lens control unit 203 then starts second control processing 408 (which will be described later) corresponding to the contents of the body-side data packet signal 406 having been received.

The first control processing 404 and the second control processing 408 executed by the lens control unit 203 are described next.

The body-side command packet signal 402 having been received may be a request for specific data available on the exchangeable lens side. In such a case, the lens control unit 203 analyzes the contents of the command packet signal 402 and generates the requested specific data through the first control processing 404. Furthermore, as part of the first control processing 404, the lens control unit 203 executes abridged communication error check processing based upon the number of data bytes so as to determine whether or not there has been any error in the communication of the command packet signal 402 by using checksum data contained in the command packet signal 402. A signal carrying the specific data generated through the first control processing 404 is output as the lens-side data packet signal 407 to the body side. It is to be noted that the body-side data packet signal 406 output from the body side following the initial output of the command packet signal 402 in this situation is a dummy data signal (still containing checksum data) which does not carry any significance to the lens side. Under these circumstances, the lens control unit 203 executes communication error check processing, such as that described above, by using the checksum data contained in the body-side data packet signal 406 as the second control processing 408.

In another scenario, the body-side command packet signal 402 may be a drive instruction for driving a lens-side drive target member. For instance, the command packet signal 402 may be a drive instruction for the focusing lens 210b and the body-side data packet signal 406 may indicate a drive quantity, i.e., the extent to which the focusing lens 210b needs to be driven. In this case, the lens control unit 203 analyzes the contents of the command packet signal 402 and generates an OK signal acknowledging that the contents have been understood in the first control processing 404. Furthermore, as part of the first control processing 404, the lens control unit 203 executes communication error check processing as described above by using the checksum data carried in the command packet signal 402. The OK signal generated through the first control processing 404 is then output to the body side as the lens-side data packet signal 407. In addition, the lens control unit 203 analyzes the contents of the body-side data packet signal 406 and executes communication error check processing, such as that described above, by using the checksum data contained in the body-side data packet signal 406 in the second control processing 408.

Upon completing the second control processing 408, the lens control unit 203 notifies the first lens-side communication unit 217 of the completion of the second control processing 408. By issuing this notification, the lens control unit 203 prompts the first lens-side communication unit 217 to output an L-level signal through the eighth lens connector terminal LP8. Namely, the signal level at the signal line RDY is set to L (T5).

It is to be noted that if the body-side command packet signal 402 is an instruction for driving a lens-side drive target member (e.g., the focusing lens) as described above, the lens control unit 203 engages the lens drive unit 212 in execution of processing through which the focusing lens 210b is driven by the extent matching the drive quantity, while sustaining the signal level at the signal line RDY at L level via the first lens-side communication unit 217.

The communication carried out from the time point T1 through the time point T5 as described above constitutes a single command data communication session. Through the single session of command data communication executed as described above, one body-side command packet signal 402 and one body-side data packet signal 406 are transmitted by the body control unit 103 and the first body-side communication unit 117. Namely, while the processing requires two separate packet signals to be transmitted, the two separate packet signals, i.e., the body-side command packet signal 402 and the body-side data packet signal 406, together constitute a set of control data.

Likewise, one lens-side command packet signal 403 and one lens-side data packet signal 407 are transmitted by the lens control unit 203 and the first lens-side communication unit 217 through the single session of command data communication. Namely, the two separate packet signals, i.e., the lens-side command packet signal 403 and the lens-side data packet signal 407, together constitute a set of response data.

As described above, the lens control unit 203 and the first lens-side communication unit 217 receive the control data from the first body-side communication unit 117 and concurrently transmit the response data to the first body-side communication unit 117. The eighth lens connector terminal LP8 and the eighth body connector terminal BP8 used for command data communication are contact points via which an asynchronous signal (a signal indicating H (high) level or L (low) level read at the signal line RDY) that is not synchronous with any clock signal is transmitted.

(Description of Hotline Communication)

The lens control unit 203 transmits lens position data to the second body-side communication unit 118 via the ninth lens connector terminal LP9, the tenth lens connector terminal LP10, the sixth lens connector terminal LP6 and the seventh lens connector terminal LP7, i.e., via the signal lines HREQ, HANS, HCLK and HDAT, by controlling the second lens-side communication unit 218. The following is a detailed description of the communication carried out by the second lens-side communication unit 218 and the second body-side communication unit 118.

It is to be noted that in the description of the embodiment, the communication carried out by the second lens-side communication unit 218 and the second body-side communication unit 118, respectively under control executed by the lens control unit 203 and the body control unit 103, will be referred to as "hotline communication".

Figure 7A:
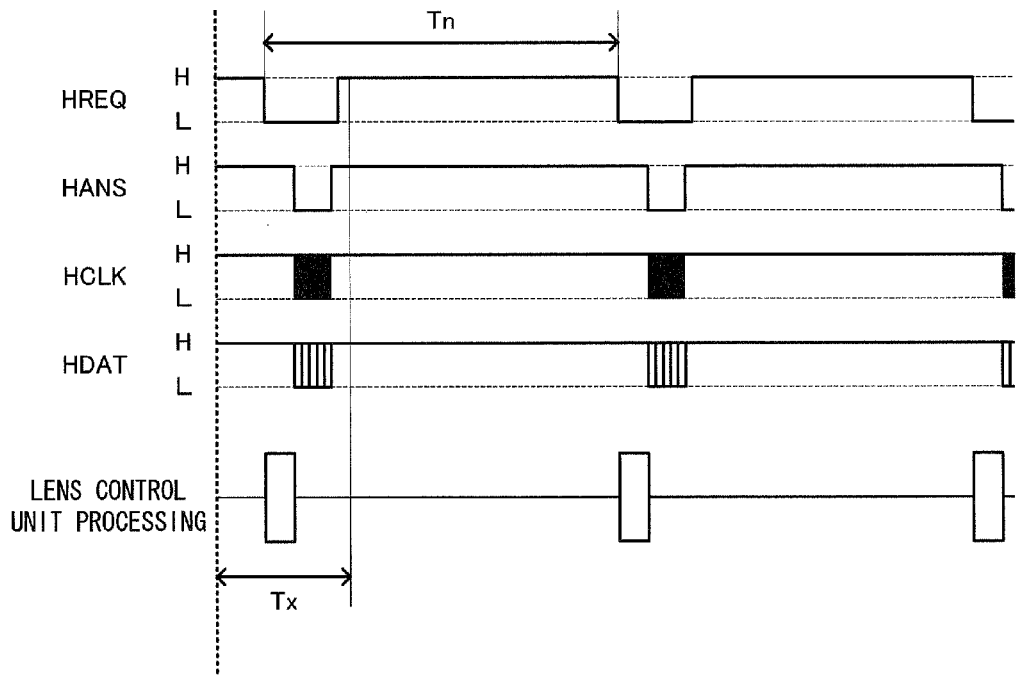
FIGS. 7A and 7B are timing charts indicating the timing with which hotline communication may be executed.
Figure 7B:
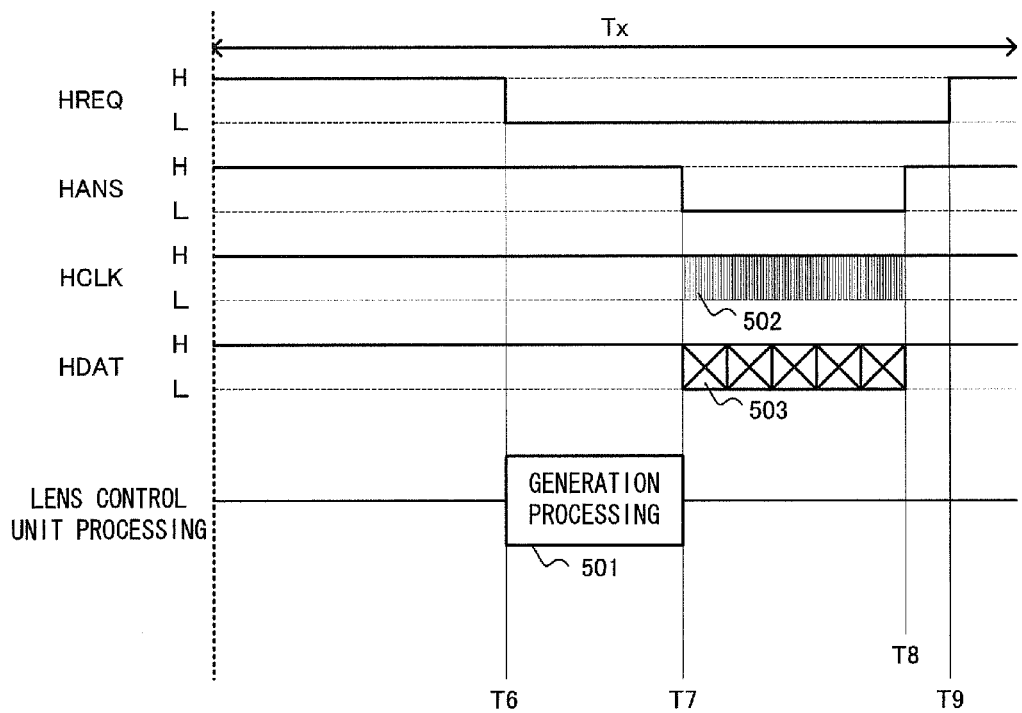

FIGS. 7A and 7B are timing charts indicating the timing with which hotline communication may be executed. The body control unit 103 in the embodiment adopts a structure that allows it to start hotline communication over predetermined second cycles (1 ms cycles in the embodiment). These cycles are shorter than the cycles over which command data communication is executed. FIG. 7A indicates that hotline communication is repeatedly executed over predetermined cycles Tn. FIG. 7B is an enlarged view of a given communication period Tx elapsing as hotline communication is repeatedly executed. The following is a description of the procedure through which hotline communication is carried out, given in reference to the timing chart in FIG. 7B.

The body control unit 103 and the second body-side communication unit 118 first output an L-level signal through the ninth body connector terminal BP9 at a hotline communication start (T6). In other words, the signal level at the signal line HREQ is set to L. The second lens-side communication unit 218 notifies the lens control unit 203 that the signal has been input to the ninth lens connector terminal LP9. In response to this notification, the lens control unit 203 starts executing data generation processing 501 in order to generate lens position data. In the generation processing 501, the lens control unit 203 engages the lens position detection unit 213 in detection of the position of the focusing lens 210b and generates lens position data indicating the detection results.

Once the lens control unit 203 completes execution of the generation processing 501, the lens control unit 203 and the second lens-side communication unit 218 output an L-level signal through the tenth lens connector terminal LP10 (T7). In other words, the signal level at the signal line HANS is set to L. In response to input of this signal at the tenth body connector terminal BP10, the body control unit 103 and the second body-side communication unit 118 output a clock signal 502 via the sixth body connector terminal BP6. Namely, the clock signal is transmitted to the second lens-side communication unit 218 via the signal line HCLK.

In synchronization with the clock signal 502, the lens control unit 203 and the second lens-side communication unit 218 output a lens position data signal 503 carrying the lens position data through the seventh lens connector terminal LP7. In other words, the lens position data signal 503 is transmitted to the second body-side communication unit 118 via the signal line HDAT.

Upon completing the transmission of the lens position data signal 503, the lens control unit 203 and the second lens-side communication unit 218 output an H-level signal through the tenth lens connector terminal LP10. In other words, the signal level at the signal line HANS is set to H (T8). In response to input of this signal at the tenth body connector terminal BP10, the second body-side communication unit 118 outputs an H-level signal through the ninth lens connector terminal LP9. In other words, the signal level at the signal line HREQ is set to H (T9).

The communication carried out from the time point T6 through the time point T9 as described above constitutes a single hotline communication session. Through the single session of hotline communication executed as described above, a single lens position data signal 503 is transmitted by the lens control unit 203 and the second lens-side communication unit 218. The ninth lens connector terminal LP9, the tenth lens connector terminal LP10, the ninth body connector terminal BP9 and the tenth body connector terminal BP10 used in hotline communication are contact points via which asynchronous signals that are not synchronous with any clock signal are transmitted. In other words, the ninth lens connector terminal LP9 and the ninth body connector terminal BP9 are contact points via which an asynchronous signal (indicating H (high) level or L (low) level read at the signal line HREQ) is transmitted, whereas the tenth lens connector terminal LP10 and the tenth body connector terminal BP10 are terminals via which an asynchronous signal (indicating H (high) level or L (low) level read at the signal line HANS) is transmitted.

It is to be noted that command data communication and hotline communication may be executed simultaneously or they may be executed partially concurrently. This means that even while one of the communication units, i.e., either the first lens-side communication unit 217 or the second lens-side communication unit 218, is engaged in communication with the camera body 100, the other communication unit is also allowed to communicate with the camera body 100.

The camera system achieved in the first embodiment as described above realizes the following advantages.

(1) Eleven lens connector terminals LP1 and LP3 through LP12 (their exposed areas), each to be connected with one of the eleven body connector terminals excluding the second body connector terminal BP2 among the twelve body connector terminals BP1 through BP12 disposed in the vicinity of the camera body mount unit 101, are disposed in the holding portion 202. The second body connector terminal BP2, which is not connected to any lens connector terminal, is a ground terminal corresponding to the first body connector terminal BP1, through which a drive voltage used to engage the lens drive unit 212 in operation is provided. The twelfth lens connector terminal LP12 functions as a common ground terminal shared by the lens drive unit 212, the first lens-side communication unit 217 and the second lens-side communication unit 218. Since this eliminates the need to wire a terminal, to be connected with the second body connector terminal BP2, within the exchangeable lens, the number of required parts can be reduced.

(2) No terminal is present in the holding portion 202 at a position corresponding to that of the second body connector terminal BP2. Since this eliminates the need for a member used to install a terminal to be connected with the second body connector terminal BP2, the number of required parts can be reduced.

(Second Embodiment)

The camera system achieved in the second embodiment of the present invention, having a configuration similar to that of the camera system in the first embodiment, includes lens connector terminals with their exposed areas assuming a profile different from the profile of the exposed areas of the lens connector terminals in the first embodiment. The following is a description of the profile of the lens connector terminals at their exposed areas as achieved in the second embodiment. It is to be noted that in the following description, the same reference numerals are assigned to components similar to those of the first embodiment so as to preclude the necessity for a repeated explanation thereof. In addition, it is assumed that the camera body is identical to that in the first embodiment.

Figure 8A:
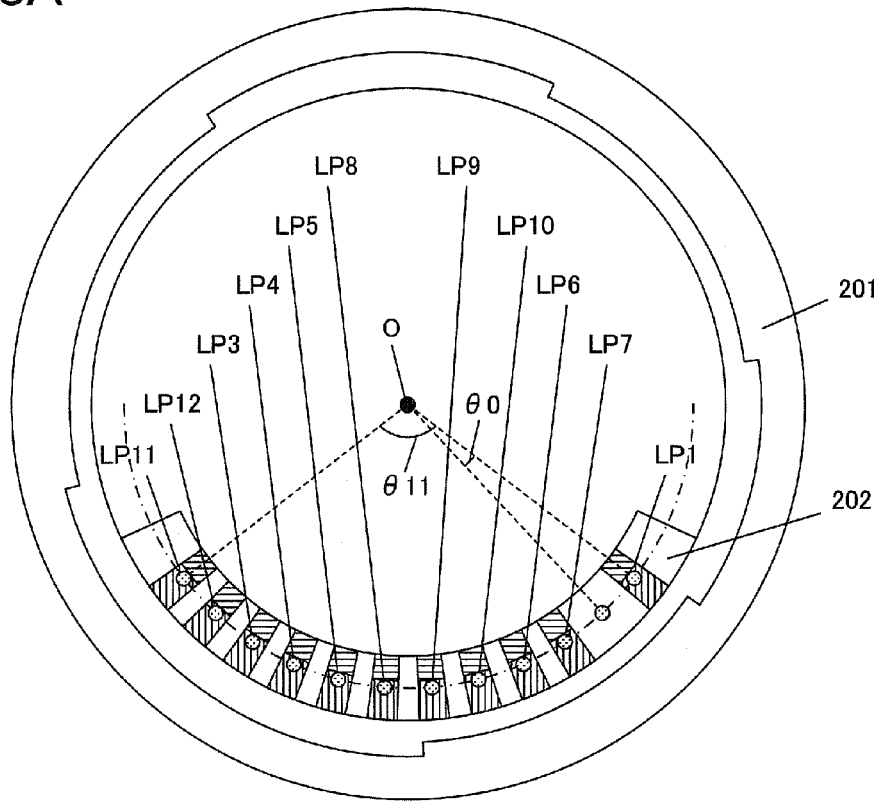
FIGS. 8A and 8B provide front views of a holding portion achieved in a second embodiment.
Figure 8B:
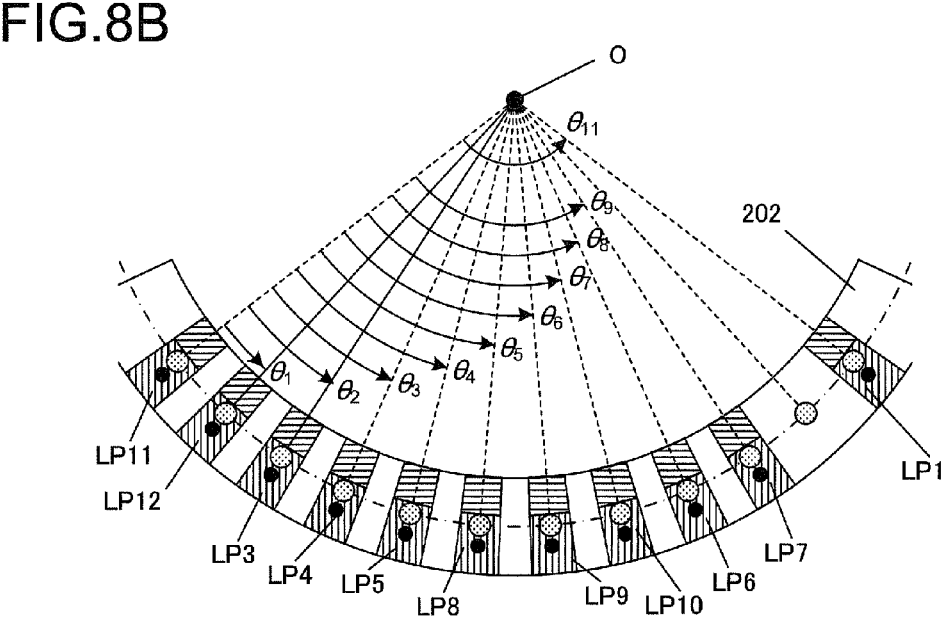

FIGS. 8A and 8B show the holding portion 202 achieved in the second embodiment in front views. As FIGS. 8A and 8B indicate, the eleven lens connector terminals LP1, LP3 through LP12 disposed in the holding portion 202 at the camera lens mount unit 201 in the embodiment each assume a size large enough to range from the inner circumferential side (the side closer to the mount center point O) of the holding portion 202 through the outer circumferential side (the side further away from the mount center point O) of the holding portion 202. However, the size of their exposed areas and the positions of the exposed areas are the same as those of the lens connector terminals in the first embodiment described in reference to FIGS. 5A and 5B. The following is a description of features unique to the second embodiment, given in reference to a sectional view of the eighth lens connector terminal LP8.

Figure 9A:
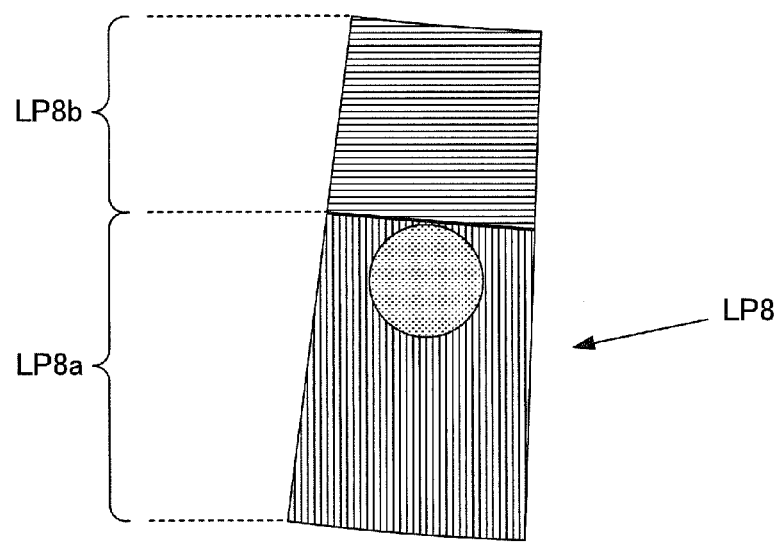
FIGS. 9A and 9B respectively provide a front view and a sectional view of the eighth lens connector terminal achieved in the second embodiment.
Figure 9B:
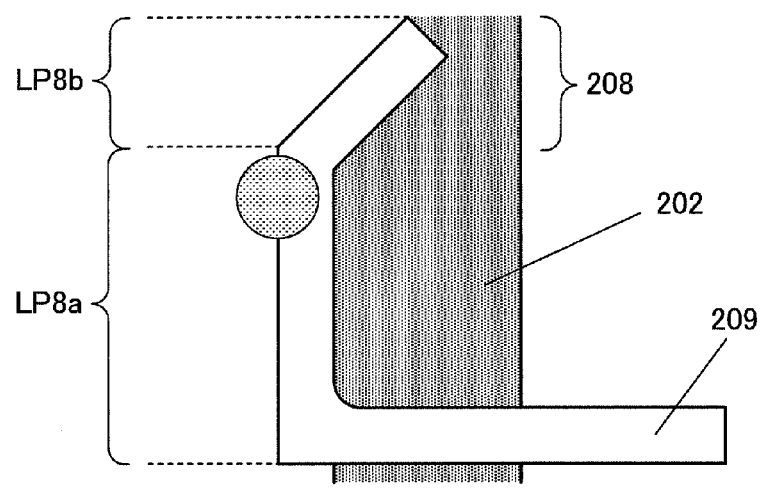

FIG. 9A is an enlarged front view of the eighth lens connector terminal LP8, whereas FIG. 9B shows the eighth lens connector terminal LP8 and the holding portion 202 in a sectional view. As shown in the sectional view presented in FIG. 9B, one end of a metal piece 209 constituting the eighth lens connector terminal LP8 is placed in a recess 208 formed at the surface of the holding portion 202. Namely, the surface of the metal piece 209 includes two different areas, i.e., an exposed area LP8a, which is exposed at the surface of the holding portion 202, and a fixing part LP8b at which the metal piece 209 is fixed to the holding portion 202. While the exposed area, viewed from the surface as in FIG. 11A, appears to be larger than those shown in FIGS. 5A and 5B, the size of the exposed area LP8a is actually the same as that of the exposed areas in FIGS. 5A and 5B.

While a repeated explanation is not provided, the exposed areas of the remaining ten lens connector terminals are identical to the exposed area of the eighth lens connector terminal LP8 described above. Namely, the size of the exposed areas and the positions of the exposed areas of the remaining ten lens connector terminals are the same as those of the lens connector terminals shown in FIGS. 5A and 5B, and the area that would appear to have been added on at the surface is accounted for by the fixing part at which each metal piece is fixed to the holding portion 202. While the explanation is given above by assuming that the sizes and positions of the exposed areas are the same as those in the first embodiment described in reference to FIGS. 5A and 5B, exposed areas may be formed to range over sizes and at positions different from those in the first embodiment.

The camera system achieved in the second embodiment as described above realizes advantages similar to those of the first embodiment.

(Third Embodiment)

While the camera system achieved in the third embodiment of the present invention has a structure similar to that of the camera system in the first embodiment, a positional arrangement different from that in the first embodiment is adopted for the lens connector terminals in the third embodiment. The following is a description of the positional arrangement with which the lens connector terminals are disposed in the third embodiment. It is to be noted that in the following description, the same reference numerals are assigned to components similar to those of the first embodiment so as to preclude the necessity for a repeated explanation thereof. In addition, it is assumed that the camera body is identical to that in the first embodiment.

Figure 10A:
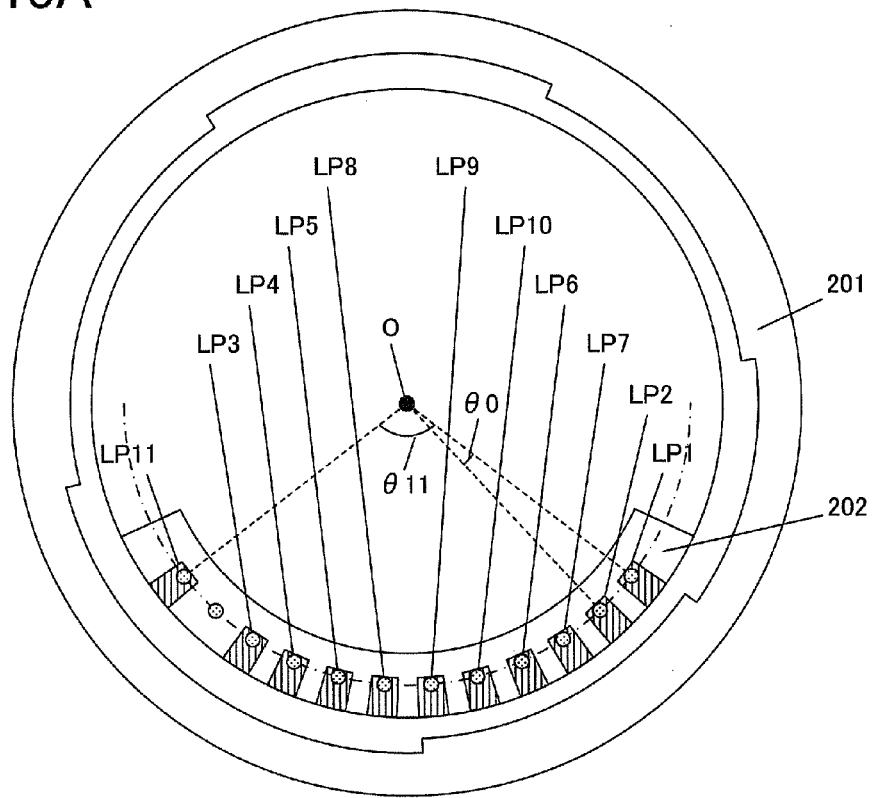
FIGS. 10A and 10B each show a holding portion achieved in a third embodiment in a front view.
Figure 10B:
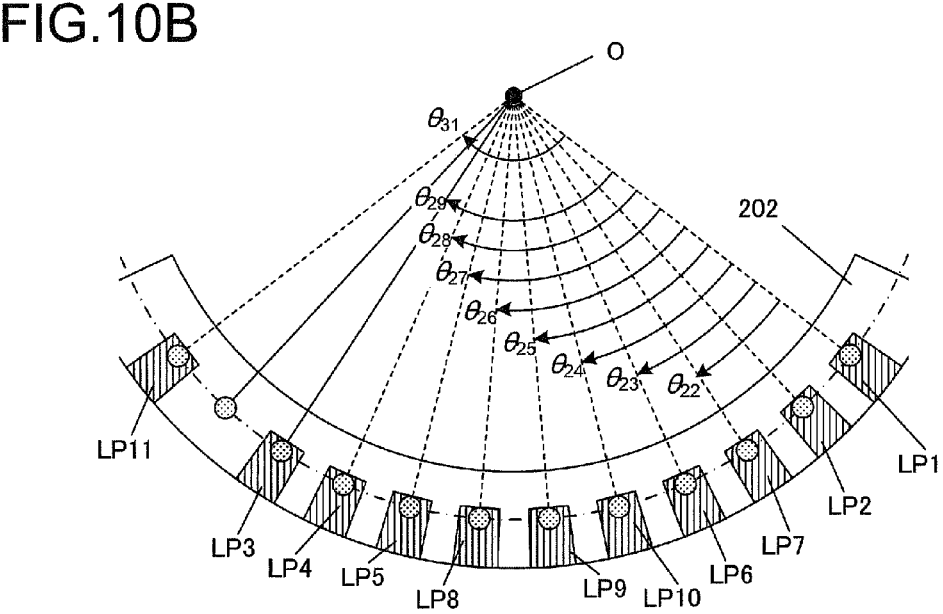

FIGS. 10A and 10B each show a holding portion 202 in the camera system achieved in the third embodiment in a front view. As FIGS. 10A and 10B show, eleven lens connector terminals LP1 through LP11, each to be connected to one of the eleven body connector terminals BP1 through BP11, are disposed in the holding portion 202 in the embodiment. While the second body connector terminal BP2 remains unconnected with any lens connector terminal in the first embodiment, a second lens connector terminal LP2, which is to connect with the second body connector terminal BP2, is present in the holding portion 202 in the present embodiment. However, the twelfth body connector terminal BP12 remains unconnected with any lens connector terminal. In other words, the twelfth lens connector terminal LP12 is not present in the holding portion 202.

It is to be noted that the internal wiring at the exchangeable lens 200 is equivalent to that achieved by replacing the twelfth lens connector terminal LP12 in the first embodiment described in reference to FIG. 3 with the second lens connector terminal LP2. Namely, the lens drive unit 212 operates on a drive voltage provided through the first lens connector terminal LP1 with the second lens connector terminal LP2 functioning as a ground terminal. In other words, circuits such as the lens control unit 203 within the exchangeable lens 200, the drive system of the lens drive unit 212 and the like share the same ground.

Next, in reference to FIG. 10B, the positional relationship among the eleven lens connector terminals LP1 through LP11 (their exposed areas) will be described. An interior angle θ11, formed by the contact area of the first lens connector terminal LP1 and the contact area of the eleventh lens connector terminal LP11 at the mount center point O, is the largest among interior angles, each formed by the contact areas of any two lens connector terminals among the eleven lens connector terminals LP1 through LP11 at the mount center point O.

An interior angle θ0, formed by the contact area of the first lens connector terminal LP1 and the contact area of the second lens connector terminal LP2 at the mount center point O, is smaller than interior angles θ22 through θ31 each formed by the contact area of a given lens connector terminal among the third lens connector terminal LP3 through the eleventh lens connector terminal LP11 and the contact area of the first lens connector terminal LP1 at the mount center point O. The interior angle θ22, formed by the contact area of the first lens connector terminal LP1 and the contact area of the seventh lens connector terminal LP7 at the mount center point O, is smaller than the interior angles θ23 through θ31 each formed by the contact area of a given lens connector terminal among the third lens connector terminal LP3 through the sixth lens connector terminal LP6 and the eighth lens connector terminal LP8 through the eleventh lens connector terminal LP11 and the contact area of the first lens connector terminal LP1 at the mount center point O.

The interior angle θ23, formed by the contact area of the first lens connector terminal LP1 and the contact area of the sixth lens connector terminal LP6 at the mount center point O, is smaller than the interior angles θ24 through θ31 each formed by the contact area of a given lens connector terminal among the third lens connector terminal LP3 through the fifth lens connector terminal LP5 and the eighth lens connector terminal LP8 through the eleventh lens connector terminal LP11 and the contact area of the first lens connector terminal LP1 at the mount center point O. The interior angle θ24, formed by the contact area of the first lens connector terminal LP1 and the contact area of the tenth lens connector terminal LP10 at the mount center point O, is smaller than the interior angles θ25 through θ31 each formed by the contact area of a given lens connector terminal among the third lens connector terminal LP3 through the fifth lens connector terminal LP5, the eighth lens connector terminal LP8, the ninth lens connector terminal LP9 and the eleventh lens connector terminal LP11 and the contact area of the first lens connector terminal LP1 at the mount center point O.

The interior angle θ25, formed by the contact area of the first lens connector terminal LP1 and the contact area of the ninth lens connector terminal LP9 at the mount center point O, is smaller than the interior angles θ26 through θ31 each formed by the contact area of a given lens connector terminal among the third lens connector terminal LP3 through the fifth lens connector terminal LP5, the eighth lens connector terminal LP8 and the eleventh lens connector terminal LP11 and the contact area of the first lens connector terminal LP1 at the mount center point O. The interior angle θ26, formed by the contact area of the first lens connector terminal LP1 and the contact area of the eighth lens connector terminal LP8 at the mount center point O, is smaller than the interior angles θ27 through θ31 each formed by the contact area of a given lens connector terminal among the third lens connector terminal LP3 through the fifth lens connector terminal LP5 and the eleventh lens connector terminal LP11 and the contact area of the first lens connector terminal LP1 at the mount center point O. The interior angle θ27, formed by the contact area of the first lens connector terminal LP1 and the contact area of the fifth lens connector terminal LP5 at the mount center point O, is smaller than the interior angles θ28 through θ31 each formed by the contact area of a given lens connector terminal among the third lens connector terminal LP3, the fourth lens connector terminal LP4 and the eleventh lens connector terminal LP11 and the contact area of the first lens connector terminal LP1 at the mount center point O.

The interior angle θ28, formed by the contact area of the first lens connector terminal LP1 and the contact area of the fourth lens connector terminal LP4 at the mount center point O, is smaller than the interior angles θ29 and θ31 each formed by the contact area of either the third lens connector terminal LP3 or the eleventh lens connector terminal LP11 and the contact area of the first lens connector terminal LP1 at the mount center point O. The interior angle θ29, formed by the contact area of the first lens connector terminal LP1 and the contact area of the third lens connector terminal LP3 at the mount center point O, is smaller than the interior angle θ31 formed by the contact area of the first lens connector terminal LP1 and the contact area of the eleventh lens connector terminal LP11 at the mount center point O. The interior angle formed by the contact area of the third lens connector terminal LP3 and the contact area of the eleventh lens connector terminal LP11 at the mount center point O is approximately twice the interior angle formed by the contact areas of any two lens connector terminals disposed next to each other among the first lens connector terminal LP1 through the tenth lens connector terminal LP10 at the mount center point O. The eleven lens connector terminals LP1 through LP11 (their exposed areas) are disposed in the holding portion 202 so as to achieve the positional relationship described above.

Advantages similar to those of the first embodiment are achieved with the camera system in the third embodiment described above.

The present invention allows for the following variations and one of the variations or a plurality of variations may be adopted in combination with either of the embodiments described above.

(Variation 1)

In the embodiments described above, the plurality of lens connector terminals are disposed along the lower edge of the holding portion 202, as illustrated in FIGS. 5A and 5B. However, the present invention is not limited to this example and the plurality of lens connector terminals may be disposed in the holding portion 202 by adopting a different positional arrangement. In addition, the plurality of lens connector terminals may be disposed at any positions within the holding portion 202 and the holding portion 202 may adopt any shape that may be different from the shape shown in FIGS. 5A and 5B.

(Variation 2)

The embodiments have been described by assuming that the position data indicating the position of the focusing lens 210b are transmitted from the exchangeable lens 200 to the camera body 100 through hotline communication. However, the present invention is not limited to this example and may be adopted in a system configured so as to transmit condition information pertaining to a drive target member other than the focusing lens through hotline communication. For instance, the present invention may be adopted in conjunction with an exchangeable lens 200 equipped with a blur correction lens, via which image blur attributable to unsteady handling during photographing operation is corrected. In such a case, position data indicating the position of the blur correction lens (X, Y position) may be transmitted through hotline communication. Furthermore, the present invention may be adopted in a system in which position information indicating the position of the aperture included in the exchangeable lens (information related to the size of the aperture opening) is transmitted. Moreover, in conjunction with an exchangeable lens 200 that includes a zoom lens, information related to the focal length of the lens may be transmitted through hotline communication. Under such circumstances, the generation processing 501 in FIG. 8B will include processing for generating blur correction lens position data, processing for generating aperture control position data pertaining to the aperture used to form the aperture opening (position information corresponding to the opening size), or processing for generating zoom lens position data.

(Variation 3)

The holding portion 102 (on the body side) and the holding portion 202 (on the lens side) are each manufactured as an integrated component (single component) in the embodiments described earlier. However, the present invention is not limited to this example and it may be adopted in conjunction with holding portions 102 and 202 each constituted with a plurality of separate holding portion parts, with one part corresponding to a specific number of terminals, which are put together as a single assembly.

(Variation 4)

While the camera system described in reference to the embodiments includes separate communication interfaces in correspondence to two different types of communication (hotline communication and command data communication), the present invention may be adopted in conjunction with an integrated communication interface. Namely, the first lens-side communication unit 217 and the second lens-side communication unit 218 on the exchangeable lens side may be integrated into a single communication unit. Likewise, the first body-side communication unit 117 and the second body-side communication unit 118 on the camera body side may be integrated into a single communication unit. Furthermore, a body control unit and a lens control unit with built-in functions enabling them to fulfill the functions of the corresponding communication interfaces, instead of the body control unit 103 and the lens control unit 203, may be utilized.

(Variation 5)

The exchangeable lens 200 in the embodiments described above is configured so that the second body connector terminal BP2, i.e., a ground terminal corresponding to the first body connector terminal BP1 connected to the positive electrode of the secondary battery 132, is not connected with any lens connector terminal. In addition, the twelfth lens connector terminal LP12 is used as a common ground terminal in conjunction with the lens control unit 203, the first lens-side communication unit 217, the second lens-side communication unit 218 and the lens drive unit, 212. As an alternative, the exchangeable lens 200 may be configured so as to use the second body connector terminal BP2 as a ground terminal with the twelfth body connector terminal BP12 not connected to any lens connector terminal. In such a case, a lens connector terminal to be connected with the second body connector terminal BP2 will be utilized as a common ground terminal in conjunction with the lens control unit 203, the first lens-side communication unit 217, the second lens-side communication unit 218 and the lens drive unit 212. In addition, no lens connector terminal will be disposed in the holding portion 202 at a position corresponding to the body connector terminal BP12 but instead a lens connector terminal will be disposed at a position corresponding to that of the second body connector terminal BP2. The alternative structure may be achieved by, for instance, moving the twelfth lens connector terminal LP12 disposed at the position corresponding to the twelfth body connector terminal BP12, as shown in FIG. 3, and FIGS. 5A and 5B, to the position corresponding to that of the second body connector terminal BP2.

(Variation 6)

In the embodiments described above, no terminal is disposed in the holding portion 202 at the position corresponding to that of the second body connector terminal BP2. As an alternative, the holding portion 202 may include a terminal disposed at the position corresponding to that of the second body connector terminal BP2, which is not connected to any of the various circuits (the lens control unit 203, the first lens-side communication unit 217, the second lens-side communication unit 218 and the lens drive unit 212) within the exchangeable lens 200. In other words, the holding portion 202 may include a member that gives the holding portion 202 the appearance of having such a terminal disposed thereat while the particular terminal remains not connected with any circuit and thus does not function as a ground terminal. This configuration is advantageous in that the individual lens connector terminals can be disposed at the holding portion 202 in a uniform pattern, which makes it possible to mount the exchangeable lens 200 at the camera body 100 smoothly. Furthermore, since the terminal does not need to be wired within the exchangeable lens 200 configured as described above, the number of required parts can be reduced.

(Fourth Embodiment)

The camera system compatible with exchangeable lenses, achieved in the fourth embodiment of the present invention, will now be explained. The basic configuration of the camera system 1, and the camera body 100 and the exchangeable lens 200, which constitute the camera system 100, is similar to that in the embodiment shown in FIGS. 1 and 2. The following explanation will focus upon the points that are different from those in the embodiment described above.

(Description of the Holding Portions 102 and 202)

Figure 11:
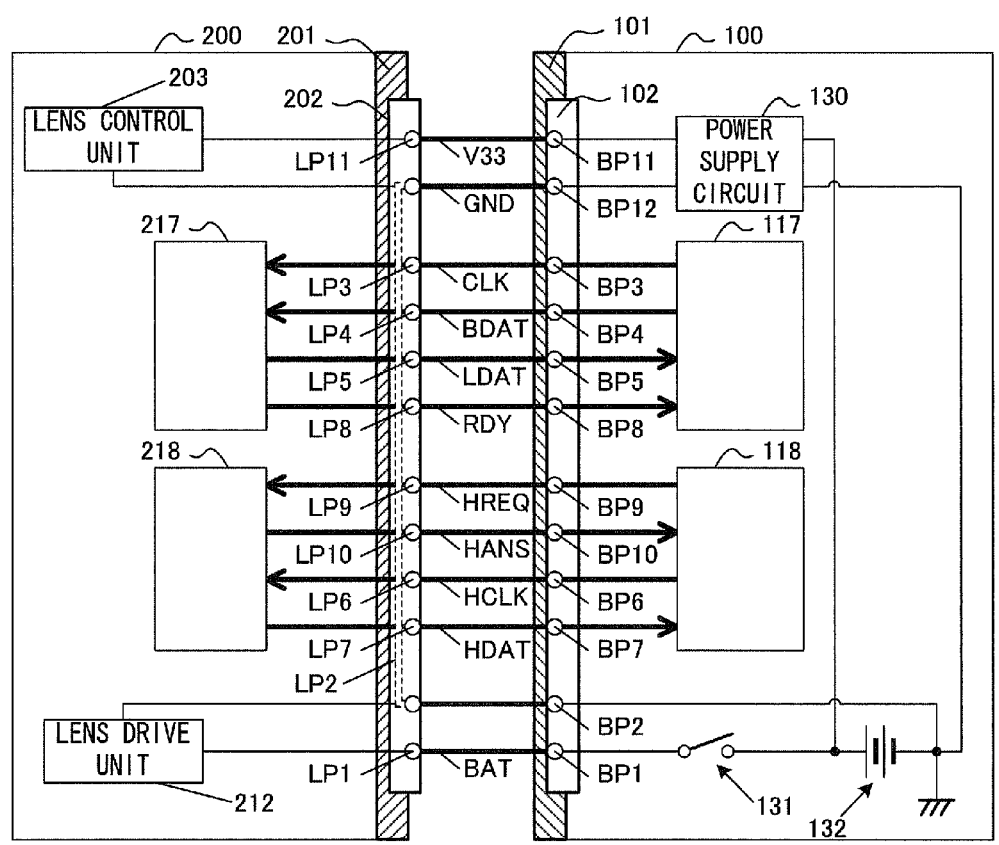
FIG. 11 is a schematic diagram showing in detail holding portions in a fourth embodiment.

FIG. 11 is a schematic diagram showing structural details of the holding portions 102 and 202 in the fourth embodiment. As shown in FIG. 11, twelve body connector terminals BP1 through BP12 are present at the holding portion 102. In addition, eleven lens connector terminals LP1 through LP11, which are connected to the twelve body connector terminals BP1 through BP12, are disposed at the holding portion 202.

A secondary battery 132, from which a voltage within a predetermined range can be provided, is installed in the camera body 100. Various units present in the camera body 100 (e.g., the body control unit 103, the first body side communication unit 117 and the second body side communication unit 118) operate on the voltage provided from the secondary battery 132. It is to be noted that instead of engaging the various units in the camera body 100 in operation by directly sourcing the voltage from the secondary battery 132, they may be engaged in operation on a voltage that has been lowered via a series regulator, a switching regulator or the like of the known art.

A positive electrode and a negative electrode of the secondary battery 132 are connected to a power supply circuit 130 disposed in the camera body 100. The eleventh body connector terminal BP11 and the twelfth body connector terminal BP12 are connected to this power supply circuit 130. Based upon the voltage provided from the secondary battery 132, the power supply circuit 130 provides an operating voltage on which various units in the exchangeable lens 200, except for the lens drive unit 212, operate, via the eleventh body connector terminal BP11. Namely, an operating voltage on which the various units in the exchangeable lens 200 (including the first lens-side communication unit 217 and the second lens-side communication unit 218), excluding the lens drive unit 212, operate is supplied through the eleventh body connector terminal BP11 and the eleventh lens connector terminal LP11.

It is to be noted that while FIG. 11 only illustrates the connection between the eleventh lens connector terminal LP11 and the lens control unit 203, the eleventh lens connector terminal LP11 is actually connected to the first lens-side communication unit 217 and the second lens-side communication unit 218 and thus, the operating voltage is also supplied to these communication units through the eleventh lens connector terminal LP11. In addition, while FIG. 11 only illustrates the connection between the second lens connector terminal LP2 and the lens control unit 203, the second lens connector terminal LP2 is also connected to the first lens-side communication unit 217 and the second lens-side communication unit 218.

While a specific range (e.g., a voltage range from 3 to 4 v), defined by a minimum voltage value and a maximum voltage value, is assumed for the voltage value representing the level of voltage that can be provided to the eleventh body connector terminal BP11, the voltage value of the voltage typically provided to the eleventh body connector terminal BP11 is close to the median of the maximum voltage value and the minimum voltage value. The value of the electric current provided from the camera body 100 to the exchangeable lens 200 in conjunction with the operating voltage will be in the range of approximately several tens of mA to several hundreds of mA in a power ON state.

The twelfth body connector terminal BP12 is a ground terminal that corresponds to the operating voltage provided to the eleventh body connector terminal BP11, and is connected to the negative electrode of the secondary battery 132 within the power supply circuit 130. The twelfth body connector terminal BP12 is connected to the second lens connector terminal LP2. Namely, the twelfth body connector terminal BP12 and the second lens connector terminal LP2 are ground terminals that correspond to the operating voltage.

In the following description, the signal line formed with the eleventh body connector terminal BP11 and the eleventh lens connector terminal LP11 will be referred to as a signal line V33. The signal line formed with the twelfth body connector terminal BP12 and the second lens connector terminal LP2 will be referred to as a signal line GND. The eleventh lens connector terminal LP11, the second lens connector terminal LP2, the eleventh body connector terminal BP11 and the twelfth body connector terminal BP12 are power supply system connector terminals used to provide power from the camera body 100 to the exchangeable lens 200.

The third body connector terminal BP3, the fourth body connector terminal BP4, the fifth body connector terminal BP5 and the eighth body connector terminal BP8 are connected to the first body-side communication unit 117. The third lens connector terminal LP3, the fourth lens connector terminal LP4, the fifth lens connector terminal LP5 and the eighth lens connector terminal LP8 at the exchangeable lens 200, corresponding to the body connector terminals BP3, BP4, BP5 and BP8, are connected to the first lens-side communication unit 217. The first body-side communication unit 117 and the first lens-side communication unit 217 exchange data with each other via these terminals (communication system terminals). The communication carried out by the first body-side communication unit 117 and the first lens-side communication unit 217 will be described in detail later.

It is to be noted that the signal line formed with the third body connector terminal BP3 and the third lens connector terminal LP3 will be referred to as a signal line CLK. In addition, the signal line formed with the fourth body connector terminal BP4 and the fourth lens connector terminal LP4 will be referred to as a signal line BDAT, the signal line formed with the fifth body connector terminal BP5 and the fifth lens connector terminal LP5 will be referred to as a signal line LDAT and the signal line formed with the eighth body connector terminal BP8 and the eighth lens connector terminal LP8 will be referred to as a signal line RDY.

The ninth body connector terminal BP9, the tenth body connector terminal BP10, the sixth body connector terminal BP6 and the seventh body connector terminal BP7 are connected to the second body-side communication unit 118. The ninth lens connector terminal LP9, the tenth lens connector terminal LP10, the sixth lens connector terminal LP6 and the seventh lens connector terminal LP7 at the exchangeable lens 200, corresponding to these body connector terminals, are connected to the second lens-side communication unit 218. The second lens-side communication unit 218 transmits data to the second body-side communication unit 118 via these terminals (communication system terminals). The communication carried out by the second body-side communication unit 118 and the second lens-side communication unit 218 will be described in detail later.

It is to be noted that the signal line formed with the ninth body connector terminal BP9 and the ninth lens connector terminal LP9 will be referred to as a signal line HREQ. In addition, the signal line formed with the tenth body connector terminal BP10 and the tenth lens connector terminal LP10 will be referred to as a signal line HANS, the signal line formed with the sixth body connector terminal BP6 and the sixth lens connector terminal LP6 will be referred to as a signal line HCLK and the signal line formed with the seventh body connector terminal BP7 and the seventh lens connector terminal LP7 will be referred to as a signal line HDAT.

The first body connector terminal BP1 is connected to the positive electrode of the secondary battery 132 via a switch 131. In addition, the second body connector terminal BP2 is connected to the negative electrode of the secondary battery 132. The secondary battery 132 provides a drive voltage to be used to drive the lens drive unit 212, to the first body connector terminal BP1. In other words, the drive voltage for the lens drive unit 212 is supplied via the first body connector terminal BP1 and the first lens connector terminal LP1. While the voltage value indicating the level of voltage that can be provided to the first body connector terminal BP1 assumes a range defined by a minimum voltage value and a maximum voltage value, the voltage value is never smaller than the voltage value indicating the level of voltage that can be provided to the eleventh body connector terminal BP11 assuming its own specific voltage value range as has been explained earlier. For instance, the maximum voltage value indicating the highest level of voltage that can be provided to the first body connector terminal BP1 may be several times the maximum voltage value indicating the highest level of voltage that can be supplied to the eleventh body connector terminal BP11. In other words, the voltage value indicating the level of voltage provided to the first body connector terminal BP1 is always different from the voltage value indicating the level of voltage provided to the eleventh body connector terminal BP11. It is to be noted that the voltage value indicating the level of voltage provided to the first body connector terminal BP1 under normal circumstances is close to the median of the maximum voltage value and the minimum voltage value assumed for the first body connector terminal BP1. The value of the electric current provided from the camera body 100 to the exchangeable lens 200 in conjunction with the drive voltage will be in the range of approximately several tens of mA to several A in the power ON state.

The second body connector terminal BP2, which is a ground terminal that corresponds to the drive voltage provided to the first body connector terminal BP1, is connected to the negative electrode of the secondary battery 132. Namely, the second body connector terminal BP2 is a ground terminal that corresponds to the drive voltage described above. The second lens connector terminal is provided in an area corresponding to this second body connector terminal BP2 in the holding portion 202 at the exchangeable lens 200. This means that when the camera body 100 and the exchangeable lens 200 are engaged with each other, the second body connector terminal BP2 is left in a state of being electrically connected with the twelfth body connector terminal BP12 and the second lens connector terminal LP2.

In the following description, the signal line formed with the first body connector terminal BP1 and the first lens connector terminal LP1 will be referred to as a signal line BAT. The first body connector terminal BP1 and the second body connector terminal BP2 are power supply system terminals used to provide power from the camera body 100 to the exchangeable lens 200.

The first lens connector terminal LP1 is connected to the lens drive unit 212 in the exchangeable lens 200. The second lens connector terminal LP2 is also connected to the lens drive unit 212. In other words, the lens drive unit 212 is engaged in operation on a drive voltage provided via the lens connector terminal LP1 with the second lens connector terminal LP2 functioning as a ground terminal thereof. Namely, circuits such as the lens control unit 203 in the exchangeable lens 200 and drive systems such as the lens drive unit 212 share a common ground terminal.

Figure 12A:
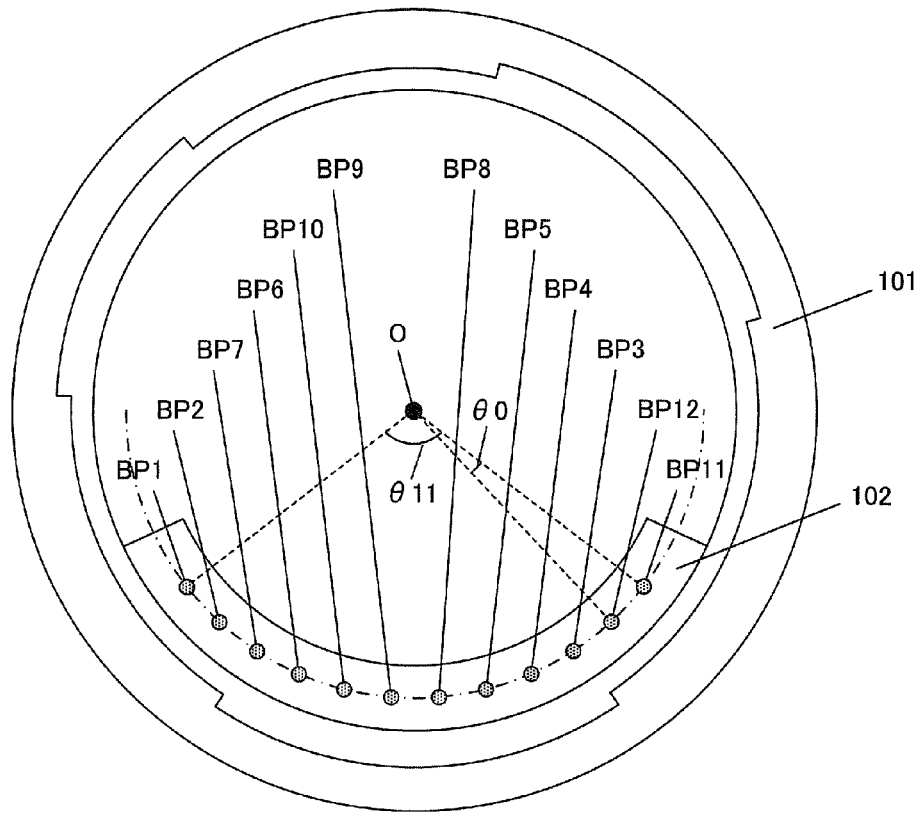
FIGS. 12A and 12B respectively show a camera body mount unit in a front view and associated holding portion in an enlarged view.
Figure 12B:
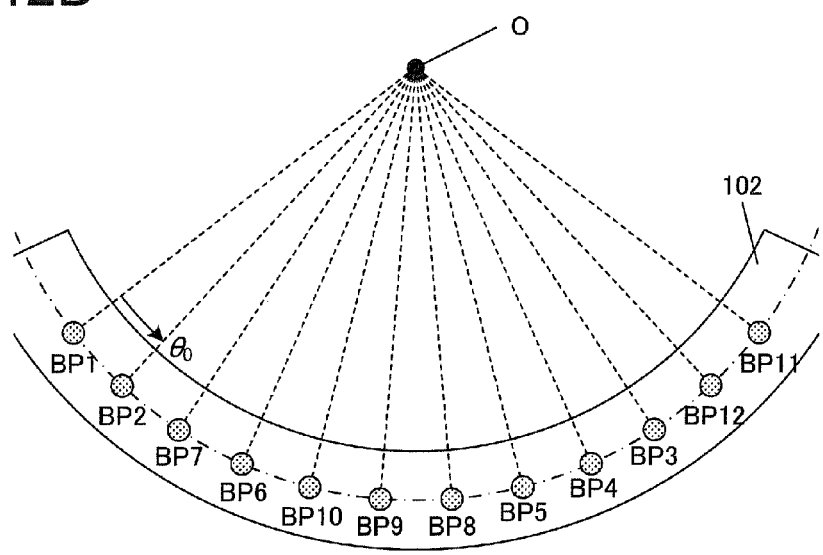
Figure 13A:
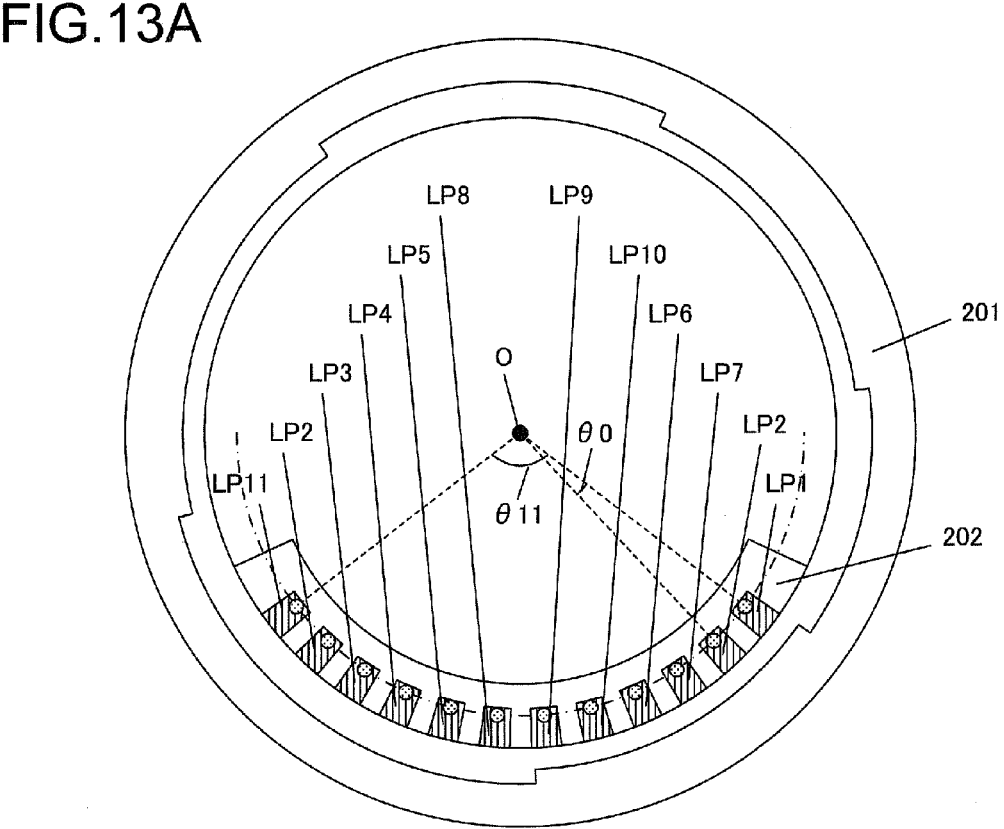
FIGS. 13A and 13B respectively show a camera lens mount unit in a front view and associated holding portion in an enlarged view.
Figure 13B:
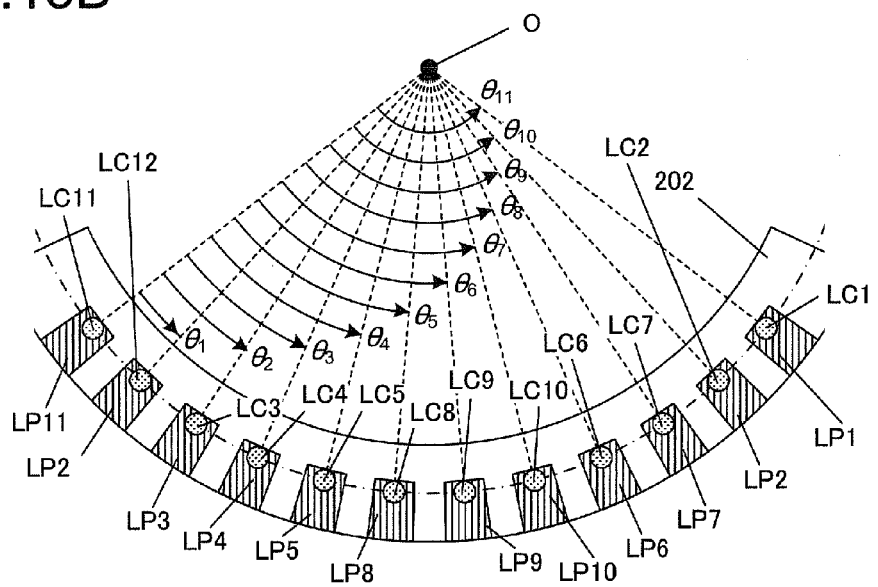

FIGS. 12A and 12B show the camera body mount unit 101 in front views. FIG. 12A shows the camera body mount unit 101 at the camera body 100 viewed from the side where the exchangeable lens 200 is present, whereas FIG. 12B shows the holding portion 102 in FIG. 12A in an enlargement. FIGS. 13A and 13B show the camera lens mount unit 201 in front views. FIG. 13A shows the camera lens mount unit 201 at the exchangeable lens 200 viewed from the side where the camera body 100 is present, whereas FIG. 13B shows the holding portion 202 in FIG. 13A in an enlargement. The mount units each assume a circular shape and the center of the circle will be referred to as a mount center point O in the following description.

As shown in FIG. 12A, the holding portion 102 is disposed at a position inward relative to the mount surface of the camera body mount unit 101 (deeper into the drawing sheet on which FIG. 12A is provided). In addition, FIG. 13A indicates that the holding portion 202 is disposed at a position further outward relative to the mount surface of the camera lens mount unit 201 (toward the person viewing FIG. 13A). The holding portion 102 and the holding portion 202 are connected as the camera body 100 and the exchangeable lens 200 are coupled by placing the mount surface of the camera body mount unit 101 in contact with the mount surface of the camera lens mount unit 201. Once the holding portions 102 and 202 are thus connected, the twelve body connector terminals BP1 through BP12 and the eleven lens connector terminals LP1 through LP11 disposed at the two holding portions become connected with each other. The second body connector terminal BP2 and the twelfth body connector terminal BP12 are connected to the second lens connector terminal LP2, as explained earlier. It is to be noted that the one-point chain lines drawn over the twelve body connector terminals BP1 through BP12 and the eleven lens connector terminals LP1 through LP11 in FIGS. 12A and 12B and FIGS. 13A and 13B indicate a locus through which the twelve body connector terminals BP1 through BP12 move when the camera body 100 is coupled with the exchangeable lens 200. Since this mount structure is of the known art, no further explanation is provided.

As shown in FIG. 12A, the twelve body connector terminals BP1 through BP12 each assume a cylindrical shape and a force imparted from a spring or the like disposed inside the holding portion 102 presses them toward the front of the camera body mount unit 101 (toward the exchangeable lens 200). In addition, as shown in FIG. 13A, the eleven lens connector terminals LP1 through LP11 each include at least one substantially rectangular conductor exposed at the surface of the holding portion 202. Once the holding portion 102 is connected with the holding portion 202, the body connector terminals are each pressed against a lens connector terminal by the force imparted from the spring or the like as described above and thus, electrical continuity is achieved between the lens connector terminals and the body connector terminals. It is to be noted that the circles drawn over the eleven lens connector terminals LP1 through LP11 in FIG. 13A and FIG. 13B indicate the positions at which the corresponding body connector terminals are pressed against the lens connector terminals.

In the following description, the particular area of each of the eleven lens connector terminals LP1 through LP11 that comes into contact with the corresponding body connector terminal when the camera body 100 and the exchangeable lens 200 are coupled together will be referred to as a contact area (an area indicated by each of the circles in FIG. 13A). In addition, the phrase "when the camera body 100 and the exchangeable lens 200 are engaged with each other" is used to refer to a state in which a voltage is supplied from the eleventh body connector terminal BP11 to the eleventh lens connector terminal LP11. It is to be noted that the term "lens connector terminal" used in the description of the embodiment refers to an entire terminal that includes an electrical wiring (a lead wire, a flexible cable or the like) used to connect the substantially rectangular area (which includes the contact area) exposed at the surface of the holding portion 202, indicated as a shaded area in FIG. 13A, with the first lens-side communication unit 217 or the second lens-side communication unit 218, as well as the rectangular area itself. In addition, the areas of the lens connector terminals LP1 through LP11 exposed at the surface of the holding portion 202, indicated as the shaded areas as explained above, may be referred to as "exposed areas" of the lens connector terminals LP1 through LP11 in the following description. It is to be noted that the exposed areas will be described in detail later in reference to the drawings.

The correspondence relation of each of the lens connector terminals and contact areas will now be explained with reference to FIG. 13B. The eleventh lens connector terminal LP11 includes an eleventh contact area LC11. The second lens connector terminal LP2 includes a twelfth contact area LC12 and a second contact area LC2. The third lens connector terminal LP3 includes a third contact area LC3. The fourth lens connector terminal LP4 includes a fourth contact area LC4. The fifth lens connector terminal LP5 includes a fifth contact area LC5. The eighth lens connector terminal LP8 includes an eighth contact area LC8. The ninth lens connector terminal LP9 includes a ninth contact area LC9. The tenth lens connector terminal LP10 includes a tenth contact area LC10. The sixth lens connector terminal LP6 includes a sixth contact area LC6. The seventh lens connector terminal LP7 includes a seventh contact area LC7. The first lens connector terminal LP1 includes a first contact area LC1.

In other words, the lens connector terminals, except the second lens connector terminal LP2, each include one contact area. Among the eleven lens connector terminals LP1 through LP11 in the present embodiment, only the second lens connector terminal LP2 includes two contact areas (the second contact area LC2 and the twelfth contact area LC12) in the holding portion 202. In addition, two substantially rectangular conductors that respectively correspond to those two contact areas shown in FIGS. 13A and 13B (the conductor that corresponds to the second contact area LC2 and the conductor that corresponds to the twelfth contact area LC12) come in one member where the two conductors are integrated (connected) inside the holding portion 202. Namely, those two conductors that give the appearance of two independent terminals from the outside of the holding portion 202 come in actually a single member that constitutes one lens connector terminal, i.e., the second lens connector terminal LP2.

As shown in FIG. 13A, the eleven lens connector terminals LP1 through LP11 are set in the holding portion 202 of the camera lens mount unit 201 so as to form a circular arc centered on the mount center point O and ranging along the camera lens mount unit 201 (along part of the camera lens mount unit 201 assuming a substantially circular shape on the outside). In the embodiment, the eleven lens connector terminals LP1 through LP11 are disposed so that the contact areas of the lens connector terminals LP1 through LP11 are set over equal intervals. An angle $\theta 11$ defined by the circular arc (the angle formed by connecting the mount center point O, the center of the first lens connector terminal LP1, and the center of the eleventh lens connector terminal LP11) is approximately 105°, whereas an angle $\theta 0$ defined by the circular arc connecting one contact area to the next contact area is approximately 9.5°.

It is to be noted that the width of the lens connector terminals LP1 through LP11 and the clearance between the individual lens connector terminals LP1 through LP11 can be altered to optimal values as necessary. For instance, the width of the lens connector terminals LP1 through LP11, measured along the direction in which the circular arc ranges, may be increased or decreased in units of $\frac{1}{10}$ mm (in units of 0.1 mm). In correspondence, the width of the clearance between the lens connector terminals, measured along the direction in which the circular arc ranges, may be adjusted to an optimal value in units of $\frac{1}{10}$ mm (in units of 0.1 mm, e.g., ±0.2 mm).

Next, in reference to FIG. 13B, the positional relationship among the twelve lens connector terminals LP1 through LP12 will be described. The interior angle $\theta 11$, formed by the first contact area LC1 and the eleventh contact area LC11 at the mount center point O, is the largest among interior angles, each formed by the contact areas of any two randomly selected lens connector terminals among twelve lens connector terminals LP1 through LP12 at the mount center point O.

An interior angle $\theta 1$, formed by the eleventh contact area LC11 and the twelfth contact area LC12 at the mount center point O, is smaller than interior angles $\theta 2$ through $\theta 11$ each formed by the contact area of a given lens connector terminal among the first contact area LC1 through the tenth contact area LC10 and the eleventh contact area LC11 at the mount center point O. The interior angle $\theta 2$, formed by the third contact area LC3 and the eleventh contact area LC11 at the mount center point O, is smaller than the interior angles $\theta 3$ through $\theta 11$ each formed by the contact area of a given lens connector terminal among the first contact area LC1, the second contact area LC2, and the fourth contact area LC4 through the tenth contact area LC10 and the eleventh contact area LC11 at the mount center point O.

The interior angle $\theta 3$, formed by the fourth contact area LC4 and the eleventh contact area LC11 at the mount center point O, is smaller than the interior angles $\theta 4$ through $\theta 11$ each formed by the contact area of a given lens connector terminal among the first contact area LC1, the second contact area LC2, and the fifth contact area LC5 through the tenth contact area LC10 and the eleventh contact area LC11 at the mount center point O. The interior angle $\theta 4$, formed by the fifth contact area LC5 and the eleventh contact area LC11 at the mount center point O, is smaller than the interior angles $\theta 5$ through $\theta 11$ each formed by the contact area of a given lens connector terminal among the first contact area LC1, the second contact area LC2, and the sixth contact area LC6 through the tenth contact area LC10 and the eleventh contact area LC11 at the mount center point O.

The interior angle $\theta 5$, formed by the contact area of the eighth contact area LC8 and the eleventh contact area LC11 at the mount center point O, is smaller than the interior angles $\theta 6$ through $\theta 11$ each formed by the contact area of a given lens connector terminal among the first contact area LC1, the second contact area LC2, the sixth contact area LC6, the seventh contact area LC7, the ninth contact area LC9, and the tenth contact area LC10 and the eleventh contact area LC11 at the mount center point O. The interior angle $\theta 6$, formed by the ninth contact area LC9 and the eleventh contact area LC11 at the mount center point O, is smaller than the interior angles $\theta 7$ through $\theta 11$ each formed by the contact area of a given lens connector terminal among the first contact area LC1, the second contact area LC2, the sixth contact area LC6, the seventh contact area LC7, and the tenth contact area LC10 and the eleventh contact area LC11 at the mount center point O.

The interior angle $\theta 7$, formed by the tenth contact area LC10 and the eleventh contact area LC11 at the mount center point O, is smaller than the interior angles $\theta 8$ through $\theta 11$ each formed by the contact area of a given lens connector terminal among the first contact area LC1, the second contact area LC2, the sixth contact area LC6, and the seventh contact area LC7 and the eleventh contact area LC11 at the mount center point O. The interior angle $\theta 8$, formed by the sixth contact area LC6 and the eleventh contact area LC11 at the mount center point O, is smaller than the interior angles $\theta 9$ through $\theta 11$ each formed by the contact area of a given lens connector terminal among the first contact area LC1, the second contact area LC2, and the seventh contact area LC7 and the eleventh contact area LC11 at the mount center point O.

The interior angle $\theta 9$, formed by the seventh contact area LC7 and the eleventh contact area LC11 at the mount center point O, is smaller than the interior angles $\theta 10$ and $\theta 11$ formed by the contact area of either the first contact area LC1 or the second contact area LC2 and the eleventh contact area LC11 at the mount center point O. The interior angle $\theta 10$, formed by the second contact area LC2 and the eleventh contact area LC11 at the mount center point O, is smaller than the interior angle $\theta 11$ formed by the first contact area LC1 and the eleventh contact area LC11 at the mount center point O.

The eleven lens connector terminals LP1 through LP11 are disposed at the holding portion 202 so that each of the contact areas achieves the positional relationship described above. It is to be noted that the second lens connector terminal LP2, functioning as a ground terminal for the first lens connector terminal LP1 and the eleventh lens connector terminal LP11 through which a source voltage (the operating voltage and the drive voltage described earlier) is provided among the power supply system terminals, is disposed between the communication system terminals, i.e., the third lens connector terminal LP3 through the tenth lens connector terminal LP10, and the first lens connector terminal LP1 and the eleventh lens connector terminal LP11, so as to minimize the extent to which the power supply system terminals (signal lines) adversely affect the communication system terminals (signal lines).

The signal line through which the source voltage is supplied (the signal line running through the first lens connector terminal LP1 and the eleventh lens connector terminal LP11) is bound to manifest a significant voltage change as the load on the source voltage recipient fluctuates. Such a significant voltage change may adversely affect the communication system signal lines. This adverse effect is minimized in the embodiment by disposing the ground terminal (the second lens connector terminal LP2), at which the voltage tends to remain stable compared to the power supply terminal (the first lens connector terminal LP1 and the eleventh lens connector terminal LP11), between the communication system terminals (the third lens connector terminal LP3 through the tenth lens connector terminal LP10) and the power supply terminal (the first lens connector terminal LP1 and the eleventh lens connector terminal LP11).

While the group of lens connector terminals connected to the first lens-side communication unit 217, i.e., the third lens connector terminal LP3, the fourth lens connector terminal LP4, the fifth lens connector terminal LP5 and the eighth lens connector terminal LP8, is disposed next to the group of lens connector terminals connected to the second lens-side communication unit 218, i.e., the ninth lens connector terminal LP9, the tenth lens connector terminal LP10, the sixth lens connector terminal LP6 and the seventh lens connector terminal LP7, none of the third lens connector terminal LP3, the fourth lens connector terminal LP4 and the fifth lens connector terminal LP5, connected to the first lens-side communication unit 217, and the sixth lens connector terminal LP6 and the seventh lens connector terminal LP7, connected to the second lens-side communication unit 218, occupies a position next to a terminal connected to a different (other) communication unit (217 or 218). In other words, the eighth lens connector terminal LP8, the ninth lens connector terminal LP9 and the tenth lens connector terminal LP10 are disposed in close proximity to each other, each occupying a position close to a terminal connected to the different (other) communication unit. This positional arrangement is adopted since signals that are not synchronous with a clock signal are transmitted through the eighth lens connector terminal LP8, the ninth lens connector terminal LP9 and the tenth lens connector terminal LP10, as will be described in detail later. A signal that is not synchronous with a clock signal manifests less change compared to the clock signal or a signal synchronous with the clock signal, e.g., a signal manifesting a status change of approximately 1 kHz to several kHz per unit time. Under normal circumstances, a clock signal and a signal synchronous with the clock signal manifest significant changes per unit time of up to several MHz (e.g., a clock signal may manifest an 8 MHz change and a data signal synchronous with the clock signal may manifest a 4 MHz change (depending upon the data volume)) and thus, such changes tend to result in noise. Accordingly, it is desirable to dispose each of the terminals through which a clock signal or a signal synchronous with the clock signal is transmitted away from any terminal connected to the different (other) communication unit, so as to minimize the adverse effect on communication. In the embodiment, such a positional arrangement is achieved by disposing the group of terminals (the eighth lens connector terminal LP8, the ninth lens connector terminal LP9 and the tenth lens connector terminal. LP10), through which signals asynchronous with the clock signal are transmitted, between the group of terminals (the third lens connector terminal LP3, the fourth lens connector terminal LP4 and the fifth lens connector terminal LP5) through which a clock signal and signals synchronous with the clock signal are transmitted in the first lens-side communication unit 217 and the group of terminals (the sixth lens connector terminal LP6 and the seventh lens connector terminal LP7) through which a clock signal and a signal synchronous with a clock signal are transmitted in the second lens-side communication unit 218.

In addition, the second lens connector terminal LP2 is disposed next to the seventh lens connector terminal LP7. This positional arrangement is adopted since the seventh lens connector terminal LP7 is higher than the sixth lens connector terminal LP6 in noise immunity. A clock signal is transmitted to the sixth lens connector terminal LP6 and a data signal synchronous with the clock signal is transmitted to the seventh lens connector terminal LP7, as will be described in detail later. If the clock signal is affected by noise and the leading edge or the trailing edge becomes unclear, the clock signal can not be correctly synchronized on the reception side. On the other hand, the data signal is sampled for signal level in the timing of leading or trailing of the clock signal. Accordingly, the data signal only needs to be clear in signal level in the timing described above and the data signal is deemed to be higher in noise immunity than the clock signal.

It is to be noted that the positional arrangement with which the twelve body connector terminals BP1 through BP12 are disposed in the holding portion 102 at the camera body 100, as shown in FIGS. 12A and 12B, is similar to the positional arrangement adopted for the eleven lens connector terminals LP1 through LP11 at the exchangeable lens 200, and for this reason, a repeated explanation is not provided. It is also to be noted that the camera body mount unit 101 adopts a mount structure widely known as a bayonet mount system, whereby it is positioned so as to face opposite the camera lens mount unit 201 and is then rotated relative to the camera lens mount unit 201 until it becomes engaged with the camera lens mount unit 201, as FIGS. 1, 12A and 12B, 13A and 13B clearly illustrate. For this reason, the body connector terminals BP1 through BP12 are disposed side-by-side along a direction opposite from the direction in which the lens connector terminals LP1 through LP11 are disposed side-by-side, as shown in FIGS. 12A and 13A. Namely, while the eleventh lens connector terminal LP11 is disposed at the left end and the first lens connector terminal LP1 is disposed at the right end in FIG. 13A, the eleventh body connector terminal BP11 is disposed at the right end and the first body connector terminal BP1 is disposed at the left end in FIG. 12A.

The camera system achieved in the fourth embodiment as described above realizes the following advantages in addition to the advantages realized by the first embodiment to the third embodiment described above.

(1) Among the twelve contact areas LC1 through LC12 provided near the camera lens mount unit 201, the second contact area LC2 connected to the second body connector terminal BP2 and the twelfth contact area LC12 connected to the twelfth body connector terminal BP12 are included in the single second lens connector terminal LP2. The second body connector terminal BP2 is a ground terminal corresponding to the first body connector terminal BP1, through which a drive voltage used to engage the lens drive unit 212 in operation is provided, and the twelfth body connector terminal BP12 is a ground terminal corresponding to the eleventh body connector terminal BP11, through which a drive voltage used to engage another circuit in operation is provided. The second lens connector terminal LP2 functions as a common ground terminal shared by the lens drive unit 212, the first lens-side communication unit 217, and the second lens-side communication unit 218. Since this eliminates the need to separately prepare a terminal to be connected with the second body connector terminal BP2 and a terminal to be connected with the twelfth body connector terminal BP12, the number of required parts can be reduced.

(2) The second lens connector terminal LP2, which includes the second contact area LC2 and the twelfth contact area LC12, is formed with a single member. As a result, the number of required parts can be reduced and cost required to assemble the exchangeable lens 200 can be reduced.

(Fifth Embodiment)

The camera system achieved in the fifth embodiment of the present invention, having a configuration similar to that of the camera system in the fourth embodiment, includes lens connector terminals with their exposed areas assuming a profile different from the profile of the exposed areas of the lens connector terminals in the fourth embodiment. The following is a description of the profile of the lens connector terminals at their exposed areas as achieved in the fifth embodiment. It is to be noted that in the following description, the same reference numerals are assigned to components similar to those of the fourth embodiment so as to preclude the necessity for a repeated explanation thereof. In addition, it is assumed that the camera body is identical to that in the fourth embodiment.

Figure 14A:
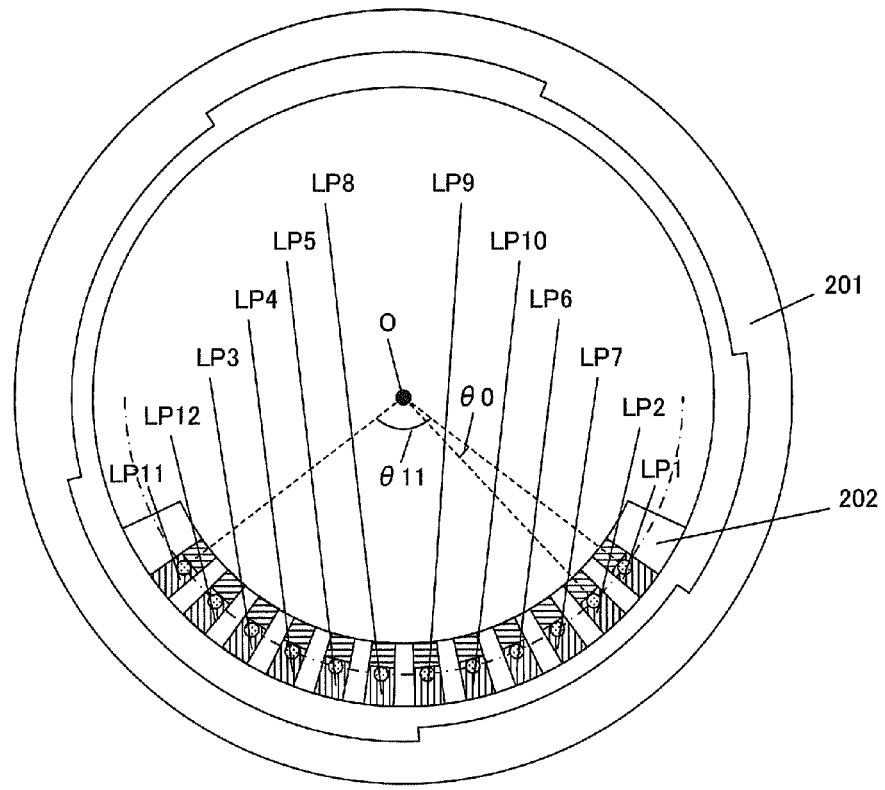
FIGS. 14A and 14B respectively show a camera lens mount unit in a front view and associated holding portion in an enlarged view in a fifth embodiment.
Figure 14B:
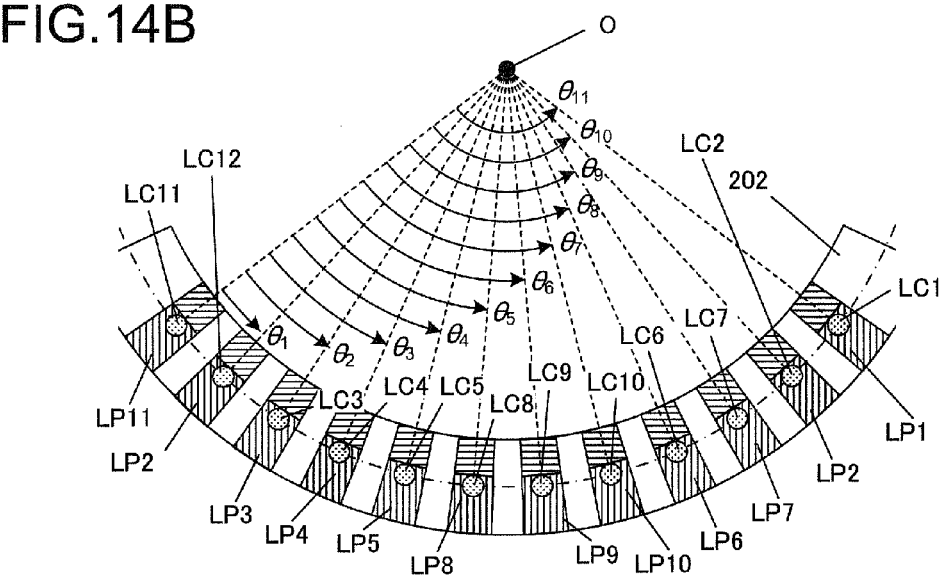

FIGS. 14A and 14B show the holding portion 202 achieved in the fifth embodiment in front views. As FIGS. 14A and 14B indicate, the eleven lens connector terminals LP1 through LP11 disposed in the holding portion 202 at the camera lens mount unit 201 in the embodiment each assume a size large enough to range from the upper side (the side closer to the mount center point O) of the holding portion 202 through the lower side (the side further away from the mount center point O) of the holding portion 202. However, the size of their exposed areas and the positions of the exposed areas are the same as those of the lens connector terminals in the fourth embodiment described in reference to FIGS. 13A and 13B. The following is a description of features unique to the fifth embodiment, given in reference to a sectional view of the eighth lens connector terminal LP8.

Figure 15A:
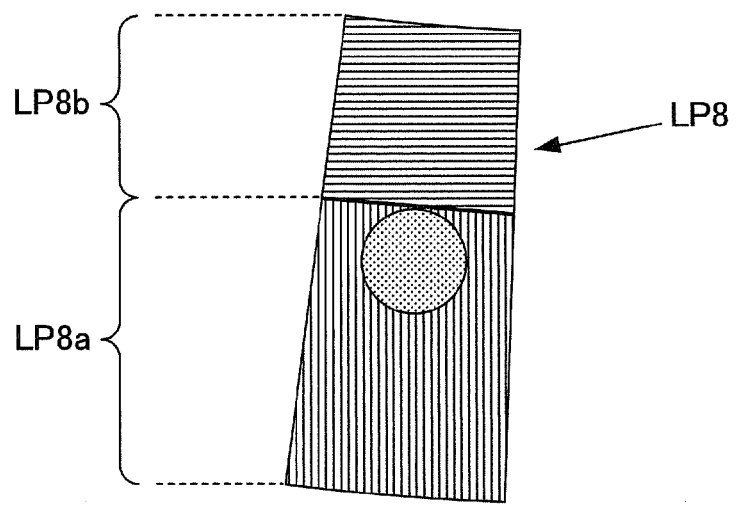
FIGS. 15A and 15B respectively provide a front view and a sectional view of the eighth lens connector terminal achieved in the fifth embodiment.
Figure 15B:
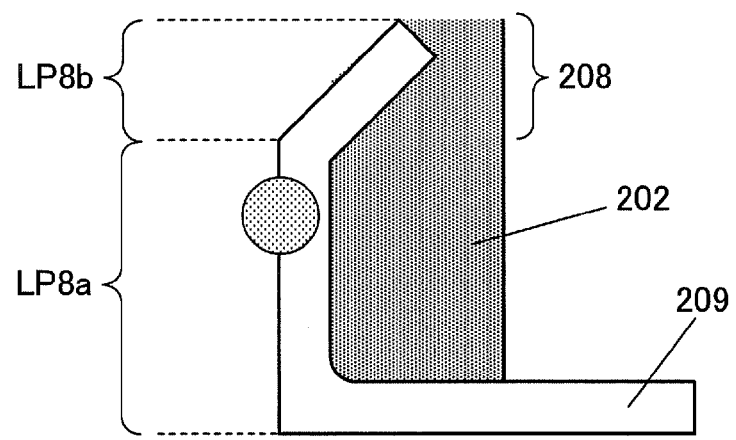

FIG. 15A is an enlarged front view of the eighth lens connector terminal LP8, whereas FIG. 15B shows the eighth lens connector terminal LP8 and the holding portion 202 in a sectional view. As shown in the sectional view presented in FIG. 15B, one end of a metal piece 209 constituting the eighth lens connector terminal LP8 is placed in a recess 208 formed at the surface of the holding portion 202. Namely, the surface of the metal piece 209 includes two different areas, i.e., an exposed area LP8a, which is exposed at the surface of the holding portion 202, and a fixing part LP8b at which the metal piece 209 is fixed to the holding portion 202. While the exposed area, viewed from the surface as in FIG. 15A, appears to be larger than those shown in FIGS. 13A and 13B, the size of the exposed area LP8a is actually the same as that of the exposed areas in FIGS. 13A and 13B. Accordingly, the eighth contact area LC8 is not provided at the fixing part LP8b in the present embodiment. The eighth contact area LC8 is provided at the exposed area LP8a of the eighth lens connector terminal LP8.

While a repeated explanation is not provided, the exposed areas of the remaining ten lens connector terminals are identical to the exposed area of the eighth lens connector terminal LP8 described above. Namely, the size of the exposed areas and the positions of the exposed areas of the remaining ten lens connector terminals are the same as those of the lens connector terminals shown in FIGS. 13A and 13B, and the area that would appear to have been added on at the surface is accounted for by the fixing part at which each metal piece is fixed to the holding portion 202. It is to be noted that while the explanation is given above by assuming that the sizes and positions of the exposed areas are the same as those in the fourth embodiment described in reference to FIGS. 13A and 13B, exposed areas may be formed to range over sizes and at positions different from those in the fourth embodiment.

The camera system achieved in the fifth embodiment as described above realizes advantages similar to those of the fourth embodiment.

Figure 16:
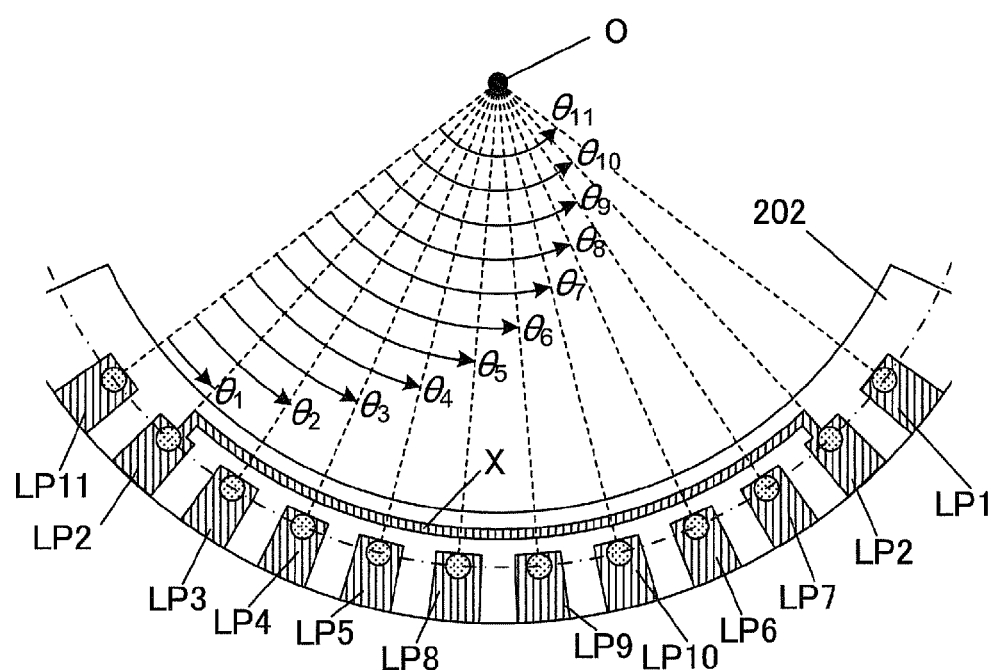
FIG. 16 shows a front view of a holding portion.

The present invention allows for the following variations and one of the variations or a plurality of variations may be adopted in combination with either of the embodiments described above. The second lens connector terminal LP2 in the embodiments described above is formed with a member assuming that the conductor member corresponding to the second contact area LC2 and the conductor member corresponding to the twelfth contact area LC12 are integrated inside the holding portion 202. The member may assume that the conductor members are integrated outside the holding portion 202. As shown in, for instance, FIG. 16, a non-contact area X that is exposed at the surface of the holding portion 202 (the plane on which the contact areas exist) and connects the second contact area LC2 with the twelfth contact area LC12 may be provided. Here, the non-contact area X is referred to as a non-contact area because it does not contact any of the body connector terminals when the exchangeable lens 200 and the camera body 100 are coupled together.

Through the embodiments of the present invention achieved as described above, the number of required parts can be reduced.

As long as the features characterizing the present invention are not compromised, the present invention is not limited to the particulars of the embodiments described above and other modes that are conceivable within the technical scope of the present invention are also within the scope of the invention.

What is claimed is:

1. An exchangeable lens, comprising:
   a camera lens mount unit having a mount center point, to which a camera body, with twelve body connector terminals disposed near a camera body mount unit at the camera body, is attached;
   a holding portion where a plurality of lens connector terminals, each including a contact area to come into contact with a body connector terminal, are disposed;
   an optical system that includes a drive target member which can be driven;
   a drive unit that drives the drive target member; and
   a control unit to be engaged in data communication with the camera body, wherein:
   the plurality of lens connector terminals comprises:
      a first lens connector terminal through which a drive voltage to be used to engage the drive unit in operation is provided from the camera body;
      a third lens connector terminal through which a first clock signal from the camera body is input;
      a fourth lens connector terminal through which a first data signal from the camera body is input in synchronization with the first clock signal;
      a fifth lens connector terminal through which a second data signal is output to the camera body in synchronization with the first clock signal;
      a sixth lens connector terminal through which a second clock signal from the camera body is input;
      a seventh lens connector terminal through which a third data signal is output to the camera body in synchronization with the second clock signal;
      an eighth lens connector terminal through which a first asynchronous signal that is not synchronous with the first clock signal or the second clock signal is output to the camera body;
      a ninth lens connector terminal through which a second asynchronous signal that is not synchronous with the first clock signal or the second clock signal is input from the camera body;

a tenth lens connector terminal through which a third asynchronous signal that is not synchronous with the first clock signal or the second clock signal is output to the camera body; and an eleventh lens connector terminal through which an operating voltage, enabling the control unit to receive the first data signal from the camera body through the fourth lens connector terminal, and to transmit the second data signal to the camera body through the fifth lens connector terminal based upon the first asynchronous signal output through the eighth lens connector terminal and the first clock signal input through the third lens connector terminal and also enabling the communication unit to transmit the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body;

an interior angle formed by the contact area of the first lens connector terminal and the contact area of the eleventh lens connector terminal at the mount center point is largest among interior angles, each formed by the contact areas of any two lens connector terminals among the plurality of lens connector terminals at the mount center point;

an interior angle formed by the contact area of the third lens connector terminal and the contact area of the eleventh lens connector terminal at the mount center point is smaller than an interior angle formed by the contact area of any lens connector terminal among the first lens connector terminal and the fourth lens connector terminal through the tenth lens connector terminal and the contact area of the eleventh lens connector terminal at the mount center point;

an interior angle formed by the contact area of the fourth lens connector terminal and the contact area of the eleventh lens connector terminal at the mount center point is smaller than an interior angle formed by the contact area of any lens connector terminal among the first lens connector terminal and the fifth lens connector terminal through the tenth lens connector terminal and the contact area of the eleventh lens connector terminal at the mount center point;

an interior angle formed by the contact area of the fifth lens connector terminal and the contact area of the eleventh lens connector terminal at the mount center point is smaller than an interior angle formed by the contact area of any lens connector terminal among the first lens connector terminal and the sixth lens connector terminal through the tenth lens connector terminal and the contact area of the eleventh lens connector terminal at the mount center point;

an interior angle formed by the contact area of the eighth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal, the ninth lens connector terminal and the tenth lens connector terminal and the contact area of the eleventh lens connector terminal at the mount center point;

an interior angle formed by the contact area of the ninth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal and the tenth lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of either the first connector terminal or the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of the first lens connector terminal and the contact area of the eleventh lens connector terminal at the mount center point; and the drive unit and the control unit comprise a common ground portion.

2. An exchangeable lens according to claim 1, wherein:
the common ground portion shares a wiring for ground voltage.

3. An exchangeable lens according to claim 1, wherein:
the common ground portion shares a terminal other than a contact portion.

4. An exchangeable lens, comprising:
a camera lens mount unit having a mount center point, to which a camera body, with twelve body connector terminals disposed near a camera body mount unit at the camera body, is attached;
a holding portion where eleven lens connector terminals, each including a contact area to come into contact with a body connector terminal, are disposed;
an optical system that includes a drive target member which can be driven;
a drive unit that drives the drive target member; and
a communication unit to be engaged in data communication with the camera body, wherein:
the eleven lens connector terminals are:
  a first lens connector terminal through which a drive voltage to be used to engage the drive unit in operation is provided from the camera body;
  a third lens connector terminal through which a first clock signal from the camera body is input;
  a fourth lens connector terminal through which a first data signal from the camera body is input in synchronization with the first clock signal;
  a fifth lens connector terminal through which a second data signal is output to the camera body in synchronization with the first clock signal;
  a sixth lens connector terminal through which a second clock signal from the camera body is input;

a seventh lens connector terminal through which a third data signal is output to the camera body in synchronization with the second clock signal;

an eighth lens connector terminal through which a first asynchronous signal that is not synchronous with the first clock signal or the second clock signal is output to the camera body;

a ninth lens connector terminal through which a second asynchronous signal that is not synchronous with the first clock signal or the second clock signal is input from the camera body;

a tenth lens connector terminal through which a third asynchronous signal that is not synchronous with the first clock signal or the second clock signal is output to the camera body;

an eleventh lens connector terminal through which an operating voltage, enabling the communication unit to receive the first data signal from the camera body through the fourth lens connector terminal, and to transmit the second data signal to the camera body through the fifth lens connector terminal based upon the first asynchronous signal output through the eighth lens connector terminal and the first clock signal input through the third lens connector terminal and also enabling the communication unit to transmit the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body; and a twelfth lens connector terminal that functions as a ground terminal corresponding to the operating voltage;

an interior angle formed by the contact area of the first lens connector terminal and the contact area of the eleventh lens connector terminal at the mount center point is largest among interior angles, each formed by the contact areas of any two lens connector terminals among the eleven lens connector terminals at the mount center point;

an interior angle formed by the contact area of the eleventh lens connector terminal and the contact area of the twelfth lens connector terminal at the mount center point is smaller than an interior angle formed by the contact area of any lens connector terminal among the first lens connector terminal through the tenth lens connector terminal and the contact area of the eleventh lens connector terminal at the mount center point;

an interior angle formed by the contact area of the third lens connector terminal and the contact area of the eleventh lens connector terminal at the mount center point is smaller than an interior angle formed by the contact area of any lens connector terminal among the first lens connector terminal and the fourth lens connector terminal through the tenth lens connector terminal and the contact area of the eleventh lens connector terminal at the mount center point;

an interior angle formed by the contact area of the fourth lens connector terminal and the contact area of the eleventh lens connector terminal at the mount center point is smaller than an interior angle formed by the contact area of any lens connector terminal among the first lens connector terminal and the fifth lens connector terminal through the tenth lens connector terminal and the contact area of the eleventh lens connector terminal at the mount center point;

an interior angle formed by the contact area of the fifth lens connector terminal and the contact area of the eleventh lens connector terminal at the mount center point is smaller than an interior angle formed by the contact area of any lens connector terminal among the first lens connector terminal and the sixth lens connector terminal through the tenth lens connector terminal and the contact area of the eleventh lens connector terminal at the mount center point;

an interior angle formed by the contact area of the eighth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal, the ninth lens connector terminal and the tenth lens connector terminal and the contact area of the eleventh lens connector terminal at the mount center point;

an interior angle formed by the contact area of the ninth lens connector terminal and the contact area of the eleventh lens connector terminal at the mount center point is smaller than an interior angle formed by the contact area of any lens connector terminal among the first lens connector terminal, the sixth lens connector terminal, the seventh lens connector terminal and the tenth lens connector terminal and the contact area of the eleventh lens connector terminal at the mount center point;

an interior angle formed by the contact area of the tenth lens connector terminal and the contact area of the eleventh lens connector terminal at the mount center point is smaller than an interior angle formed by the contact area of any lens connector terminal among the first lens connector terminal, the sixth lens connector terminal and the seventh lens connector terminal and the contact area of the eleventh lens connector terminal at the mount center point;

an interior angle formed by the contact area of the sixth lens connector terminal and the contact area of the eleventh lens connector terminal at the mount center point is smaller than an interior angle formed by the contact area of either the first lens connector terminal or the seventh lens connector terminal and the contact area of the eleventh lens connector terminal at the mount center point;

an interior angle formed by the contact area of the seventh lens connector terminal and the contact area of the eleventh lens connector terminal at the mount center point is smaller than an interior angle formed by the contact area of the first lens connector terminal and the contact area of the eleventh lens connector terminal at the mount center point; and the interior angle formed by the contact area of the first lens connector terminal and the contact area of the seventh lens connector terminal at the mount center point is approximately twice the interior angle formed by contact areas of any two lens connector terminals disposed next to each other among the third lens connector terminal through the twelfth lens connector terminal at the mount center point.

5. An exchangeable lens according to claim 4, wherein:

an area, where a ground terminal among the body connector terminals is to be positioned while a voltage is supplied from the camera body through the eleventh lens connector terminal, ranges between the first lens connector terminal and the seventh lens connector terminal along a circumference of a circle centered on the mount center point.

6. An exchangeable lens, comprising:
a camera lens mount unit having a mount center point, to which a camera body, with twelve body connector terminals disposed near a camera body mount unit at the camera body, is attached;
a holding portion where eleven lens connector terminals, each including a contact area to come into contact with a body connector terminal, are disposed;
an optical system that includes a drive target member which can be driven;
a drive unit that drives the drive target member; and
a communication unit to be engaged in data communication with the camera body, wherein:
the eleven lens connector terminals are:
  a first lens connector terminal through which a drive voltage to be used to engage the drive unit in operation is provided from the camera body;
  a second lens connector terminal that functions as a ground terminal corresponding to the drive voltage;
  a third lens connector terminal through which a first clock signal from the camera body is input;
  a fourth lens connector terminal through which a first data signal from the camera body is input in synchronization with the first clock signal;
  a fifth lens connector terminal through which a second data signal is output to the camera body in synchronization with the first clock signal;
  a sixth lens connector terminal through which a second clock signal from the camera body is input;
  a seventh lens connector terminal through which a third data signal is output to the camera body in synchronization with the second clock signal;
  an eighth lens connector terminal through which a first asynchronous signal that is not synchronous with the first clock signal or the second clock signal is output to the camera body;
  a ninth lens connector terminal through which a second asynchronous signal that is not synchronous with the first clock signal or the second clock signal is input from the camera body;
  a tenth lens connector terminal through which a third asynchronous signal that is not synchronous with the first clock signal or the second clock signal is output to the camera body; and
  an eleventh lens connector terminal through which an operating voltage, enabling the communication unit to receive the first data signal from the camera body through the fourth lens connector terminal, and to transmit the second data signal to the camera body through the fifth lens connector terminal based upon the first asynchronous signal output through the eighth lens connector terminal and the first clock signal input through the third lens connector terminal and also enabling the communication unit to transmit the third data signal to the camera body through the seventh lens connector terminal based upon the second asynchronous signal input through the ninth lens connector terminal, the third asynchronous signal output through the tenth lens connector terminal and the second clock signal input through the sixth lens connector terminal, is provided from the camera body;
an interior angle formed by the contact area of the first lens connector terminal and the contact area of the eleventh lens connector terminal at the mount center point is largest among interior angles, each formed by contact areas of any two lens connector terminals among the eleven lens connector terminals at the mount center point;
an interior angle formed by the contact area of the first lens connector terminal and the contact area of the second lens connector terminal at the mount center point is smaller than an interior angle formed by the contact area of any lens connector terminal among the third lens connector terminal through the eleventh lens connector terminal and the contact area of the first lens connector terminal at the mount center point;
an interior angle formed by the contact area of the first lens connector terminal and the contact area of the seventh lens connector terminal at the mount center point is smaller than an interior angle formed by the contact area of any lens connector terminal among the third lens connector terminal through the sixth lens connector terminal and the eighth lens connector terminal through the eleventh lens connector terminal and the contact area of the first lens connector terminal at the mount center point;
an interior angle formed by the contact area of the first lens connector terminal and the contact area of the sixth lens connector terminal at the mount center point is smaller than an interior angle formed by the contact area of any lens connector terminal among the third lens connector terminal through the fifth lens connector terminal and the eighth lens connector terminal through the eleventh lens connector terminal and the contact area of the first lens connector terminal at the mount center point;
an interior angle formed by the contact area of the first lens connector terminal and the contact area of the tenth lens connector terminal at the mount center point is smaller than an interior angle formed by the contact area of any lens connector terminal among the third lens connector terminal through the fifth lens connector terminal, the eighth lens connector terminal, the ninth lens connector terminal and the eleventh lens connector terminal and the contact area of the first lens connector terminal at the mount center point;
an interior angle formed by the contact area of the first lens connector terminal and the contact area of the ninth lens connector terminal at the mount center point is smaller than an interior angle formed by the contact area of any lens connector terminal among the third lens connector terminal through the fifth lens connector terminal, the eighth lens connector terminal and the eleventh lens connector terminal and the contact area of the first lens connector terminal at the mount center point;
an interior angle formed by the contact area of the first lens connector terminal and the contact area of the eighth lens connector terminal at the mount center point is smaller than an interior angle formed by the contact area of any lens connector terminal among the third lens connector terminal through the fifth lens connector terminal and the eleventh lens connector terminal and the contact area of the first lens connector terminal at the mount center point;
an interior angle formed by the contact area of the first lens connector terminal and the contact area of the fifth lens connector terminal at the mount center point is smaller than an interior angle formed by the contact area of any lens connector terminal among the third lens connector terminal, the fourth lens connector terminal and the eleventh lens connector terminal and the contact area of the first lens connector terminal at the mount center point;

an interior angle formed by the contact area of the first lens connector terminal and the contact area of the fourth lens connector terminal at the mount center point is smaller than an interior angle formed by the contact area of either the third lens connector terminal or the eleventh lens connector terminal and the contact area of the first lens connector terminal at the mount center point;

an interior angle formed by the contact area of the first lens connector terminal and the contact area of the third lens connector terminal at the mount center point is smaller than an interior angle formed by the contact area of the first lens connector terminal and the contact area of the eleventh lens connector terminal at the mount center point; and the interior angle formed by the contact area of the third lens connector terminal and the contact area of the eleventh lens connector terminal at the mount center point is approximately twice the interior angle formed by contact areas of any two lens connector terminals disposed next to each other among the first lens connector terminal through the tenth lens connector terminal at the mount center point.

7. An exchangeable lens according to claim 6, wherein:

an area, where a ground terminal among the body connector terminals is to be positioned while a voltage is supplied from the camera body through the eleventh lens connector terminal, ranges between the third lens connector terminal and the eleventh lens connector terminal along a circumference of a circle centered on the mount center point.

8. An exchangeable lens, comprising:

a camera lens mount unit having a mount center point, to which a camera body, with twelve body connector terminals disposed near a camera body mount unit at the camera body, is attached;

a holding portion where twelve contact areas, each coming into contact with a body connector terminal, are disposed;

an optical system that includes a drive target member which can be driven; and a drive unit that drives the drive target member, wherein:

the twelve contact areas are:
- a first contact area through which a drive voltage to be used to engage the drive unit in operation is provided from the camera body;
- a second contact area that is grounded corresponding to the drive voltage;
- a third contact area through which a first clock signal from the camera body is input;
- a fourth contact area terminal through which a first data signal from the camera body is input in synchronization with the first clock signal;
- a fifth contact area through which a second data signal is output to the camera body in synchronization with the first clock signal;
- a sixth contact area through which a second clock signal from the camera body is input;
- a seventh contact area through which a third data signal is output to the camera body in synchronization with the second clock signal;
- an eighth contact area through which a first asynchronous signal that is not synchronous with the first clock signal or the second clock signal is output to the camera body;
- a ninth contact area through which a second asynchronous signal that is not synchronous with the first clock signal or the second clock signal is input from the camera body;
- a tenth contact area through which a third asynchronous signal that is not synchronous with the first clock signal or the second clock signal is output to the camera body;
- an eleventh contact area through which an operating voltage, in order to receive the first data signal from the camera body through the fourth contact area and to transmit the second data signal to the camera body through the fifth contact area based upon the first asynchronous signal output through the eighth contact area and the first clock signal input through the third contact area, and also in order to transmit the third data signal to the camera body through the seventh contact area based upon the second asynchronous signal input through the ninth contact area, the third asynchronous signal output through the tenth contact area, and the second clock signal input through the sixth contact area, is provided from the camera body; and
- a twelfth contact area that is grounded corresponding to the operating voltage;

an interior angle formed by the first contact area and the eleventh contact area at the mount center point is largest among interior angles, each formed by any two contact areas among the twelve contact areas at the mount center point;

an interior angle formed by the eleventh contact area and the twelfth contact area at the mount center point is smaller than an interior angle formed by any one contact area among the first contact area through the tenth contact area and the eleventh contact area at the mount center point;

an interior angle formed by the third contact area and the eleventh contact area at the mount center point is smaller than an interior angle formed by any one contact area among the first contact area, the second contact area and the fourth contact area through the tenth contact area and the eleventh contact area at the mount center point;

an interior angle formed by the fourth contact area and the eleventh contact area at the mount center point is smaller than an interior angle formed by any one contact area among the first contact area, the second contact area and the fifth contact area through the tenth contact area and the eleventh contact area at the mount center point;

an interior angle formed by the fifth contact area and the eleventh contact area at the mount center point is smaller than an interior angle formed by any one contact area among the first contact area, the second contact area and the sixth contact area through the tenth contact area and the eleventh contact area at the mount center point;

an interior angle formed by the eighth contact area and the eleventh contact area at the mount center point is smaller than an interior angle formed by any one contact area among the first contact area, the second contact area, the sixth contact area, the seventh contact area, the ninth contact area, and the tenth contact area and the eleventh contact area at the mount center point;

an interior angle formed by the ninth contact area and the eleventh contact area at the mount center point is smaller than an interior angle formed by any one contact area of the first contact area, the second contact area, the sixth contact area, the seventh contact area and the tenth contact area and the eleventh contact area at the mount center point;

an interior angle formed by the tenth contact area and the eleventh contact area at the mount center point is smaller than an interior angle formed by any one contact area among the first contact area, the second contact area, the sixth contact area, and the seventh contact area and the eleventh contact area at the mount center point;

an interior angle formed by the sixth contact area and the eleventh contact area at the mount center point is smaller than an interior angle formed by any one contact area among the first contact area, the second contact area, and the seventh contact area and the eleventh contact area at the mount center point;

an interior angle formed by the seventh contact area and the eleventh contact area at the mount center point is smaller than an interior angle formed by any one contact area of either the first contact area or the second contact area and the eleventh contact area at the mount center point;

an interior angle formed by the second contact area and the eleventh contact area at the mount center point is smaller than an interior angle formed by the first contact area and the eleventh contact area at the mount center point; and the exchangeable lens comprises eleven lens connector terminals that are a first lens connector terminal that includes the first contact area, a second lens connector terminal that includes the second contact area and the twelfth contact area, a third lens connector terminal that includes the third contact area, a fourth lens connector terminal that includes the fourth contact area, a fifth lens connector terminal that includes the fifth contact area, a sixth lens connector terminal that includes the sixth contact area, a seventh lens connector terminal that includes the seventh contact area, an eighth lens connector terminal that includes the eighth contact area, a ninth lens connector terminal that includes the ninth contact area, a tenth lens connector terminal that includes the tenth contact area, and an eleventh lens connector terminal that includes the eleventh contact area.

9. An exchangeable lens according to claim 8, wherein:
the second lens connector terminal comprises a first connector portion that is exposed to a surface of the holding portion and electrically connects the second contact area with the twelfth contact area.

10. An exchangeable lens according to claim 9, wherein:
the first connector portion comprises a non-contact area that does not contact any of the twelve body connector terminals when the camera body is coupled to the camera lens mount unit.

11. An exchangeable lens according to claim 8, wherein:
the second lens connector terminal comprises a second connector portion that connects the second contact area with the twelfth contact area in a housing of the exchangeable lens.

* * * * *